US007634377B2

(12) United States Patent
Kasselmann et al.

(10) Patent No.: US 7,634,377 B2
(45) Date of Patent: Dec. 15, 2009

(54) UNITARY DATA FORMAT FOR MEASUREMENT DEVICES

(75) Inventors: Daniel Kasselmann, Karlsruhe (DE); Michael Leiber, Pleasanton, CA (US); Reiner Lange, Ettlingen (DE); Thomas Kiaupat, Ettlingen (DE); Ralf Kaase, Karlsruhe (DE); Roland Springholz, Waldbronn (DE)

(73) Assignee: Agilent Technologies, Inc., Santa Clara, CA (US)

( * ) Notice: Subject to any disclaimer, the term of this patent is extended or adjusted under 35 U.S.C. 154(b) by 25 days.

(21) Appl. No.: 11/502,574

(22) Filed: Aug. 10, 2006

(65) Prior Publication Data

US 2007/0067120 A1    Mar. 22, 2007

(30) Foreign Application Priority Data

Sep. 19, 2005   (EP) ................... 05108601

(51) Int. Cl.
*G06F 19/00*   (2006.01)
*G06F 17/30*   (2006.01)
(52) U.S. Cl. .............. 702/127; 702/119; 707/102
(58) Field of Classification Search ............ 702/127, 702/19, 32, 119
See application file for complete search history.

(56) References Cited

U.S. PATENT DOCUMENTS 6,804,677 B2 * 10/2004 Shadmon et al. ............ 707/101

| 2002/0059566 | A1 * | 5/2002 | Delcambre et al. .......... 717/146 |
| 2004/0167912 | A1 * | 8/2004 | Tsui et al. .................... 707/100 |
| 2004/0177062 | A1 * | 9/2004 | Urquhart et al. ............... 707/3 |
| 2005/0120029 | A1 * | 6/2005 | Tomic et al. ................. 707/100 |
| 2007/0112808 | A1 * | 5/2007 | Howard et al. .............. 707/100 |
| 2007/0129894 | A1 * | 6/2007 | Yung et al. .................... 702/19 |

FOREIGN PATENT DOCUMENTS

EP    1 315 358 A1   9/2002

OTHER PUBLICATIONS

Wang, "Integrating GIS's and Remote Sensing Image Analysis Systems by Unifying Knowledge Representation Schemes", Jul. 1991, IEEE Transactions on Geoscience and Remote Sensing, vol. 29, No. 4, pp. 656-664.*
Torlone et al., "A Unified Framework for Data Translation over the Web", 2002, IEEE, pp. 350-358.*
Seung-Jin Lim et al., "An automated integration approach for semi-structured and structured data", 2001, IEEE, pp. 12-21.*
"Molecular Spectrometry Data Interchange Applications for NIST's SpectroML", Journal of the Association for Laboratory Automation, Elsevier, vol. 9, No. 6, Dec. 2004, pp. 346-354.
Partial European Search Report Dated Jan. 26, 2006.

* cited by examiner

*Primary Examiner*—Hal D Wachsman
(74) *Attorney, Agent, or Firm*—Marc Bobys

(57) ABSTRACT

A method of processing data includes providing input data by a measurement device, converting the input data into output data provided in a unified data format, wherein the unified data format is a unique data format which is independent of individual formats of various measurement devices, wherein the unique data format is a relational data format, and the relational data format is a format in which data items are grouped to data item groups being logically linked to one another, and further processing the output data.

15 Claims, 22 Drawing Sheets

UNITARY DATA FORMAT FOR MEASUREMENT DEVICES

This application claims priority from European Patent Application No. 05108601.5, filed on 19 Sep. 2005, which is incorporated by reference in its entirety.

BACKGROUND

The present invention relates to a unitary data format for measurement devices.

Measurement instruments are applied to execute various measurement tasks in order to measure any kind of physical parameter. Known measurement instruments use a bus architecture applying a command and communication standard to implement test in measurement. Each measurement instrument has a specific driver with measurement instruments specific commands. A programming software implements interfaces to each measurement instrument and processes the measurement instruments specific information in order to communicate with the measurement instrument.

EP 1,315,358 A1 by the same applicant Agilent Technologies discloses a measurement management system for controlling a measurement instrument and comprising a driver, a database, a processing unit and a plurality of user interfaces. Measurement instruments can be coupled to the driver through any kind of data communication network. Data communication within the measurement management system is provided using a measurement management system data format. In the measurement management system data format, measurement data may be represented using a proprietary format.

However, for a communication between a measurement device and a connected device, it may be necessary according to EP 1,315,358 A1 that the communication language between the measurement device and the connected device is individually adjusted to one another.

SUMMARY

It is an object of the invention to provide an efficient data format for measurement devices. The object is solved by the independent claims. Further embodiments are shown by the dependent claims.

According to an exemplary embodiment of the present invention, a data processing device (e.g. a computer or a software module) is provided, comprising a processor unit adapted to convert input data provided by a measurement device (e.g. experimental data acquired by means of a measurement device the during a measurement) into output data provided in a unified data format (e.g. in a standardized normalized measurement-device-independent data representation format).

According to another exemplary embodiment, a measurement apparatus is provided, the measurement apparatus comprising an input data generation device (e.g. a measurement data acquisition unit) adapted to generate input data related to a measurement carried out by means of the measurement apparatus, and a data processing device having the above mentioned features adapted to convert the input data into the output data provided in the unified data format.

According to still another exemplary embodiment, a method of processing data is provided, the method comprising converting input data provided by a measurement device into output data provided in a unified data format.

According to yet another exemplary embodiment, a computer-readable medium (e.g. a CD, a DVD, a harddisk, a floppy disk, a USB stick or any memory card), on which a computer program of processing data is stored, is provided, which computer program, when being executed by a processor (e.g. by a CPU of a computer), is adapted to control or carry out the above mentioned method.

According to still another exemplary embodiment, a program element (e.g. a software component) of processing data is provided, which program element, when being executed by a processor, is adapted to control or carry out the above mentioned method.

Embodiments can be partly or entirely embodied or supported by one or more suitable software programs, which can be stored on or otherwise provided by any kind of data carrier, and which might be executed in or by any suitable data processing unit. A unitary data format for measurement devices according to an embodiment can be realized by a computer program, i.e. by software, or by using one or more special electronic optimization circuits, i.e. in hardware, or in hybrid form, i.e. by means of software components and hardware components.

According to an exemplary embodiment, an interpreter is provided which is capable of translating data in various data formats which data may be provided by different measurement devices into a unique data format which may be independent of the individual formats of the various measurement devices. Thus, a data presentation syntax may be provided which is not bound to any specific requirements of an individual measurement device. By taking this measure, the data provided at an output of the data processing device may be independent of one or more measurement devices used.

Thus, it may become possible to use various measurement devices, for instance in a biolab, for instance measurement devices of several different manufacturers, and the result data of all of these measurement device types in different proprietary formats may be converted into a format which is independent of measurement device specific language and which may be both human readable and machine readable.

Particularly, the conversion provided by the processor unit may separate, in the data flow, content and format of the data so that the resulting data are format independent and may be used independently from the measurement device which has detected these data. Therefore, it may be possible to unify different proprietary formats, that is to say data in a manufacturer specific format from different measurement devices, so as to provide the data for further analysis in a uniform format.

This may be advantageous for the further analysis, since the evaluation of the data can be performed independently from any restrictions defined by a measurement specific data format, and the output data are directly comparable.

Particularly, structurally similar data of different measurement devices may be transferred into a unified data format so that all data are available in a common format. For this purpose, an interpreter may be provided which may convert the different proprietary formats into one common format. Therefore, a unified data schema/format may be obtained. For instance, XML (Extensible Markup Language,) may be used as a flexible generic format for defining an accurate common speech grammar. Thus, a basic language with a simple common grammar may be used as an accurate instruction or regulation for communicatively arranged measurement devices.

Particularly, such an interpreter may be capable of filtering information out of the structured data, so that only a part, namely a format independent portion of the measurement data, may be provided for further analysis. Thus, the data may be reconditioned so as to remove language specific components, so that what remains may be a generally understandable data extract, for instance consisting of content data (for example raw measurement data).

For this purpose, each of the measurement devices can have an import and/or export interface which may be coupled to a common interpreter unit. Alternatively, a separate interpreter module may be inserted in each of the measurement devices so as to interpret or transfer of the data from the input data into the output data internally in the measurement apparatus.

The data conversion unit may be implemented as an access library which reconditions the data and brings them into a common format independently of the measurement device which is the origin or the creator of the data.

Such an interpreter may be a database with library components on which the various measurement devices may have access. For instance, each of the measurement devices may have access to an assigned one of the library components which is specifically adapted for transferring data provided by a proprietary format of this specific measurement device into a measurement device independent format. Thus, such a library component assembly may be a software collection on which each of the measurement devices may have access.

For instance, the interpreter may be provided on a central server, for instance as a web service, on which the different measurement devices networked within this network may have access.

Alternatively, it is possible to mount an interpreter module directly in a measurement device. Such a module may be a software and/or a hardware component.

According to an exemplary embodiment, a transparent data format with a relational connection between the data may be provided. The data may be linked, not necessarily only in a hierarchic manner, but also with a complex unidirectional or bidirectional logical coupling between objects on the same level or on different levels of a data structure. Therefore, data originating from different measurement devices and being available in different formats may be inserted as input data into an interpreter unit which converts the data and provides, at an output thereof, the data in a common format. These data may then be supplied to a user.

The relational interconnection between output data items may be particularly denoted as reconditioning the data in the form of data modules, wherein the different modules or entities have a defined or definable relation to one another. Different entities may be ordered hierarchically in the case of simple data structures. Additionally or alternatively, a non-hierarchical or not purely hierarchical linkage of the entities may be performed, which may allow for mapping a complex work cycle into a logical data structure. Thus, logical linkages of the different entities may be performed on the same level, in a relational manner, and/or on different levels.

Each individual application may provide the data in a proprietary format, and then an interpreter may convert these individual data into a common format.

XML may be suitable as an output format of the data because XML is a human readable text format language which is simultaneously machine readable. XML is capable of separating content data and structural data ("metadata"), wherein format and content may be separated. Such an XML schema may be used for defining a virtual database, since the XML format lays open its data and is thus transparent. Furthermore, XML has meanwhile developed to be to some kind of quasi-standard language, which is generally accepted or acknowledged by the measurement device community. According to an embodiment, XML is used as a syntax kit which is specifically adapted to provide measurement data in a measurement unspecific data format.

According to an embodiment, referential integrity may be achieved. In other words, when different objects point to one another, completeness may be ensured, and a linkage on an industrial standard level may be obtained.

An interpreter according to an exemplary embodiment can easily be extended or retrofitted, for instance updated, when a new measurement device shall be integrated in a network or shall be put into operation. For this purpose, one additional software tool may be included in the software library which is adapted to transfer data from the format of this measurement device to the general unified format.

An XML output file can be automatically post-processed. From an output file in XML, data of a measurement can be extracted. These data may then be post-processed, for instance may be used for establishing a measurement documentation, for providing data so as to be viewable on a viewer, for archiving the data, etc.

According to an embodiment, a unified normalized standardized data schema for measurement data may be obtained which schema may be defined according to an industrial standard or quasi standard. A "standard" in this context may particularly denote any data format which is basically accepted by a majority of the participants in an industrial branch.

Particularly, the Extensible Markup Language (XML) may be used for defining a relational data schema for measurement applications. XML is a standard for generating structured machine readable and human readable files. XML in general defines only the basic constitution of such files. For a concrete application, the details of the file constitution may be further specified or individualized.

Next, further exemplary embodiments will be described.

In the following, exemplary embodiments of the data processing device will be described. However, these embodiments also apply for the measurement apparatus, for the method of processing data, for the computer-readable medium and for the program element.

The processor unit may be adapted to convert input data provided by a plurality of measurement devices or by a plurality of types of measurement devices into the output data provided in the unified data format. In other words, a plurality of inputs may be provided at the data processing device, each input being adapted for connection of one particular measurement device.

The communication between the data processing device and the measurement device(s) may be realized in any manner, for instance in a wired or in a wireless manner. For example, the communication may occur via at least one bus, a Local Area Network (LAN), a Controller Area Network (CAN), the Internet, HPIB (Hewlett Packard Interface Bus) and RS232. For instance, the communication may be carried out via the Internet.

The communication types between any of the measurement devices and the data processing device may differ. For instance, a part of the measurement devices may communicate with the processor unit in a wireless manner, and another part of the measurement devices may communicate with the processor unit in a wired manner. The processor unit may thus be adapted as a flexible communication node which has the capability to communicate with a plurality of different measurement devices (for instance of different manufacturers) or with different type of measurement devices (for instance liquid chromatography devices and gel electrophoresis devices). Each of such measurement devices having an individual communication format may be connected to an input of the data processing device. The data processing device may then recognize automatically which type of measurement device is connected. Then, input data delivered from a respective measurement device to the data processing device may be converted so that the output data is in a unified data format. Thus, heterogeneous data types at the inputs may be converted to a homogeneous data format at the different outputs of the data processing device.

The processor unit may further be adapted to convert input data provided by a plurality of measurement devices, which input data is provided in different data formats, into the output data format in the unified data format. Therefore, the data formats in which the input data is provided by different measurement devices may be proprietary data formats. Such data formats may include device-specific information (for instance included in a header) and/or may include a device-specific data structure (for instance providing measurement data in columns, as a vector, etc.).

Examples for software tools which are run in combination with measurement devices of Agilent Technologies are the ChemStation© software tool or the Cerity© software tool. These software tools of Agilent Technologies are control applications which may capture data of a measurement device and which may evaluate this data, as well as provide a data interface for accessing measurement data. The ChemStation© software tool is a more decentralized approach for a direct communication between a personal computer and the measurement instrument. The Cerity© software tool uses a more centralized approach of one or more decentralized personal computers coupled to measurement devices, however having access to a central data base. According to the Cerity© software tool, one personal computer may control a plurality of measurement devices.

The input data may be provided by the measurement device in a proprietary data format. The term "proprietary data format" may particularly denote a data format which relates to a privately developed and/or privately owned technology. Such a proprietary data format may be specific for a particular manufacturer of a measurement device or for a particular type or series of a measurement device. A proprietary data format may relate to the way in which the data is presented, transported and structured.

The output data may be provided in a standardized data format. The term "standardized data format" may particularly denote a data format which is brought into conformity with a generally accepted standard. Such a standard may be an industrial standard or a quasi standard, that is to say a data format which is generally accepted by most of the relevant participants in an industrial branch.

Particularly, the unified data format may be a human readable format. The term "human readable format" may particularly denote a format which is understandable for or interpretable by a human user, particularly having skills in the art of software development. In contrast to, for example, a binary format comprising a sequence of values "0" and "1", a human readable format is provided in a format so that a human brain may be capable of understanding which kind of data are provided or which sequence of logical commands has to be executed. Thus, it may be easy for an engineer to understand from the output data in the human readable format which data are provided.

Additionally or alternatively, the unified data format may be a machine readable format. Thus, the structure of the output data may be such that not only a human being can understand which kind of data are provided, but the data may be provided in a format so that, without any intermediate step, a machine can be fed with these data, and the machine may be capable of further processing this data. An example for such a data format which is capable to be read by a human being and by a machine is the Extensible Markup Language (XML). In this format, content data may be separated from definitions concerning presentation or representation of the data content. That is to say, the data is represented in a generic string which is not device specific and may use generic and transparent XML data.

The machine readable format may thus be a format which may be processed by means of computational resources. Such computational resources may be any microprocessor, for instance a CPU. For instance, such a microprocessor may operate in the context of a viewing application which displays a measurement result based on provided data. Such computational resources may also operate in the context of an application which is adapted to provide a hardcopy of the data (for instance a printout or a PDF file). Or, the computational resources may further process the data, for instance evaluate the data and check whether the experiment is usable or not. This may include checking the consistence of the data, carrying out a statistical analysis, deriving secondary data (e.g. parameters) from primary measurement data or the like.

The unified data format may be a plaintext format. The term "plaintext format" may particularly denote a format which comprises a sequence of letters and numbers. For instance, a code which comprises a sequence of instructions including content data, wherein sequence commands are ordered in a logical manner, may be provided in plaintext so as to be directly readable by a human programmer and by a machine.

The unified data format may be a relational data format. By taking this measure, a modular data structure with a plurality of objects may be provided in which the different objects are linked to one another in a hierarchical or in a non-hierarchical manner. For instance, a hierarchy of different objects may be present, and objects from different hierarchical levels are coupled to other objects of the same hierarchical levels, of a higher hierarchical level and/or of a lower hierarchical level.

The unified data format may be a format in which content data of the input data is separated from structural data of the input data. For instance, the output data format may consist of the content data and may be free of any structural data, or a part of structural data may be completely separated from a part of content data. By taking this measure, it is possible to directly access the output data file and to concentrate on data of interest. Thus, when interested in content data, no measures have to be taken to further separate structural data from the content data, but the result in an output file may be directly used.

The structural data may be data related to data management and/or to the linkage of the content data. Thus, structural data may be related to a coupling schema of data or to logical connections between content data, but not to a content data (e.g. values of a measurement) itself. In contrast to this, content data may be measurement results like a temperature, an intensity measured by a fluorescence detector, a measurement time, a concentration of a fraction of proteins of a bioanalytical sample, or the like. In contrast to this, structural data may separate content data of different sequences of a measurement from one another, may define a format in which the content data are provided, or the like.

For instance, the unified data format may be based on the Extensible Markup Language (XML). XML may be considered as a simplified subset of SGML, capable of describing many different kinds of data. A purpose is to facilitate the sharing of structured text and information. Languages based on XML (for example RDF, RSS, MathML, XSIL and SVG) are themselves described in a formal way, allowing programs to modify and validate documents in these languages without prior knowledge of their form. XML is an example for a unified data format which has become a quasi industrial standard due to the extensive use of XML in many fields.

The unified data format may be based on the Extensible Markup Language (XML), wherein the Extensible Markup Language may be used to define a schema of the unified data format. Furthermore, the Extensible Markup Language may be used to describe the content of the unified data format.

The processor unit may be adapted to filter at least a part of the input data from the input data and to provide the filtered part of the input data as the output data. Such filtering may include extracting content data from a mixture of content data and structural data and to provide only the content data at an output. This filter may thus include a data reduction feature so that all data may be eliminated which relate to the definition and execution of a special format, but not to the measurement itself. Thus, data of a measurement may be provided completely independent of a particular measurement machine used.

For instance, the processor unit may be adapted to filter at least a part of the input data from the input data and to convert the filtered part of the input data into the output data, wherein the filtered part of the input data includes raw measurement data. Such raw measurement data may be simple numbers or values (for instance counting rates of a multichannel detector) which have been detected by the measurement device, without any pre-analysis.

Particularly, the processor unit may be adapted to filter at least a part of the input data from the input data and to convert the filtered part of the input data into the output data, wherein a non-filtered part of the input data includes pre-processed measurement data. Thus, any interpretation of the pure raw data may be removed by the filtering process so as to have the measurement data free of any interpretation.

Filtering at least a part of the input data may further include selecting one or more items of the input data according to one or more predetermined selection criteria. This selection may include, for instance, removing all letter-based information, and providing only number-based information at an output.

Raw measurement data may be data which is directly received from the measurement device free from any pre-processing. Thus, it is possible that the raw measurement data does not include any interpretation of the measurement or any analysis of the measurement so that the raw measurement data may be free of any processing intelligence, and may simply represent naked measurement data.

Pre-processed measurement data may be raw measurement data which has been modified or analyzed according to a predetermined processing schema. For instance, when a sequence of fluorescence detection intensities are provided, the pre-processed measurement data may already contain a normalization of the data to an average value or the like. Thus, the pre-processed data are not the directly obtained or measured data, but already include some kind of interpretation, modification or evaluation based on different criteria.

The data processing device may be adapted as a hardware module or as a software module to be inserted in an interface of the measurement device. Thus, the data processing device may be a kind of adaptor which may be provided separately for each individual measurement device of a group of measurement devices, or which may be provided separately for different groups of measurement devices. Such a module may be inserted in an interface of a measurement device and may provide, at an output, data in a format which is independent of the measurement device. Therefore, for an external user, the data may be provided in an output format in which the data are already independent of a particular measurement device used.

A module does not necessarily have to be a hardware component which is connected or mounted on the measurement device, but may also be a software routine which is provided to a control software running on a measurement device. This software routine may then be a software library which also includes a software routine capable of transferring data generated by this particular measurement device into a non-proprietary output format.

Alternatively, the data processing device may comprise a database unit for storing a plurality of components, wherein each of the components is adapted to be accessible by an assigned one of a plurality of types of measurement devices. For instance, for the different measurement devices available, individual interpretation or translation routines may be programmed and may be stored in the database unit. When the measurement device "XY" is then connected to the data processing device, the presence of the measurement device "XY" is detected by the data processing device and the corresponding software component is retrieved from the database unit. This particular item of program code is then used to convert the data in the proprietary format of the measurement device "XY" into a format independent of the measurement device used, so that a user being provided with the output data may be incapable to determine whether the measurement device "XY" has acquired the data, or another measurement device "AB".

The components of the database unit may be software components or computer program elements. Such a computer program may be at least one of the group consisting of a software element, a software sub-library, a subroutine, a sub-database, an executable file, and a source code. Thus, the term "software component" or "computer program" may particularly denote an element which, independently from other files, can be executed. However, such a computer program may also be a "dependent" application, for instance a subroutine to which another computer program may have access, or a sub-library comprising a, collection of program elements or the like. The computer program may also be a database comprising information to which another application may have access. The computer program may be a source code which can be executed after compilation, or may be already pre-compiled executable code.

The data processing device may comprise a server computer adapted for network communication with the measurement device or with a plurality of measurement devices. Thus, a single server computer having the data processing device implemented thereon may be provided for a plurality of measurement devices in common so as to simultaneously control a plurality of measurement devices. Thus, the server computer may serve as a central hub receiving data in different languages and translating the data of these different languages into output data of a single, non-proprietary language. Such a network communication may communicate via a LAN (Local Area Network), or via the Internet.

The processor unit may be adapted to provide the output data in the unified data format with a relational link of output data items. The term "relational linkage" of the output data items may be a logical relationship between the output data items. Thus, the different data items which may also be grouped to objects may be logically linked to one another with unidirectional or bidirectional couplings. Therefore, the simulation of a complex measurement environment is possible since objects of the same or of a different hierarchical level may be functionally coupled and connected by means of logical operations, for instance Boolean logic.

The processor unit may further be adapted to provide the output data in the unified data format with a non-hierarchical linkage of output data items. Thus, also output data items of the same hierarchical level may be connected in a logical manner to one another. This allows to simulate a complex logical system and does thus remove any restrictions in which the non-proprietary data format may be implemented.

The processor unit may be adapted to provide the output data in the unified data format so that output data items are coupled by means of pointers pointing from one of the output data items to another one of the output data items. By means of such pointers, a logical connection with a direction information may be realized.

The output data items may comprise at least one of the group consisting of measurement user data items, measurement resource data items, measurement setup data items, measurement content data items, and measurement result data items. Measurement user data items may relate to a user carrying out a measurement. Measurement resource data items may include the information which resources (of devices or computational resources) may be used for carrying out the measurement device, for instance which measurement devices are available and linked in which manner. The measurement setup data items may include information concerning the setup of the measurement, namely the coupling of the different devices, the kind of measurement to be carried out, or the like. The measurement content data items may include, qualitatively or quantitatively, a definition of the measurement to be carried out. For instance, which samples have to be mixed in which manner and which information shall be measured. The measurement result data items include a definition of the measurement results, namely of the parameters to be derived from the measurement data, or the like.

Each of the output data items may comprise an assigned unique identifier, which may comprise an assigned unique two-dimensional identification information. Therefore, by identifying each of the output data items by unique identifier, it is possible to structure the measurement in a logical manner.

The data processing device may comprise a memory management unit adapted for storing the output data. Such a memory may be any kind of storage medium like a flash memory, a RAM memory, a ROM memory, an EEPROM, an FRAM memory, an SRAM memory, an MRAM memory, or the like. Such a storage element may also be realized as a compact memory card (for instance a flash card) or an USB stick, or any kind of replaceable cartridge that may be removably inserted in the system. It may be particularly advantageous to have a rewritable memory.

The memory management unit may be adapted for storing the output data with assigned indices so that the output data are retrievable by means of an index search. Thus, by simply searching the memory management unit for keywords, it may be possible to find any desired data item in a quick manner.

The data processing device may comprise a first user interface adapted to provide a hardcopy of the output data. The term "hardcopy" particularly denotes any form of the output data in which it can be presented physically to a human being. Such a hardcopy may be a paper printout of the measurement result or a PDF file, or a WORD file.

The data processing device may further comprise a second user interface which may be adapted to provide the output data in a reconditioned manner. For instance, the second user interface may output the data in a manner so as to be directly viewable by a viewing application. For instance, the result of a measurement can then be represented in a form of a diagram, a graph or the like.

Any of the first or second user interfaces may be a Graphical User Interface (GUI). Such a Graphical User Interface may include a display device (like a cathode ray tube, a liquid crystal display, a plasma display device or the like) for displaying information to a human operator, like data related to the execution of the measurement. Further, a Graphical User Interface may comprise an input device allowing the user to input data or to provide the system with control commands. Such an input device may include a keypad, a joystick, a trackball, or may even be a microphone of a voice recognition system. The GUI may allow a human user to communicate in a bidirectional manner with the system.

The measurement device may be adapted to measure a physical parameter of at least one of a device, a system, a substance, and a fluid. Such a physical parameter may be a temperature, a pressure value, a concentration of a component of an analyt, or the like.

The unified data format may be a format in which at least a significant part of data is understandable for different systems. Thus, the unified data format may comprise at least a portion in which the data are provided completely independent of any structural information.

The unified data format may be a data format according to an industrial standard or quasi standard, that is to say to a data format which is generally accepted by the majority of the industrial companies of a branch.

In the following, exemplary embodiments of the measurement apparatus will be described. However, these embodiments also apply for the data processing device, for the method of processing data, for the computer readable medium and for the program element.

The measurement device may be adapted to measure at least one physical, chemical, or biological parameter of an analyt under examination. Examples for physical parameters are temperature, pressure, volume or the like. Examples for chemical parameters are a concentration, a pH value, or the like. Examples for biological parameters are presence or absence of proteins or genes in a solution, biological activity of a sample, or the like.

The measurement device may further comprise at least one of a sensor device, a test device for testing a device under test or a substance, a device for chemical, biological and/or pharmaceutical analysis, a fluid separation system adapted for separating components of a fluid, a capillary electrophoresis device, a liquid chromatography device, a gas chromatography device, an electric measurement device, and a mass spectroscopy device. Thus, exemplary application fields of a measurement device according to embodiments are gas chromatography, mass spectroscopy, UV spectroscopy, optical spectroscopy, IR spectroscopy, liquid chromatography, and capillary electrophoresis bioanalysis. More generally, the device according to embodiments may be integrated in an analysis device for chemical, biological and/or pharmaceutical analysis. Such an analysis system may be a fluid separation device, a liquid chromatography device, an electrophoresis system, or the like. In a realization of the apparatus is a device for chemical, biological and/or pharmaceutical analysis, functions like (protein) purification, electrophoresis investigation or solutions, fluid separation, or chromatography investigations may be realized by the analysis device. An example for a measurement device is an apparatus of the 1100 Series for liquid chromatography (LC) of Agilent Technologies.

BRIEF DESCRIPTION OF DRAWINGS

Other objects and many of the attendant advantages of embodiments of the present invention will be readily appreciated and become better understood by reference to the following more detailed description of embodiments in connection with the accompanied drawings. Features that are substantially or functionally equal or similar will be referred to by the same reference signs.

Figure 1A:
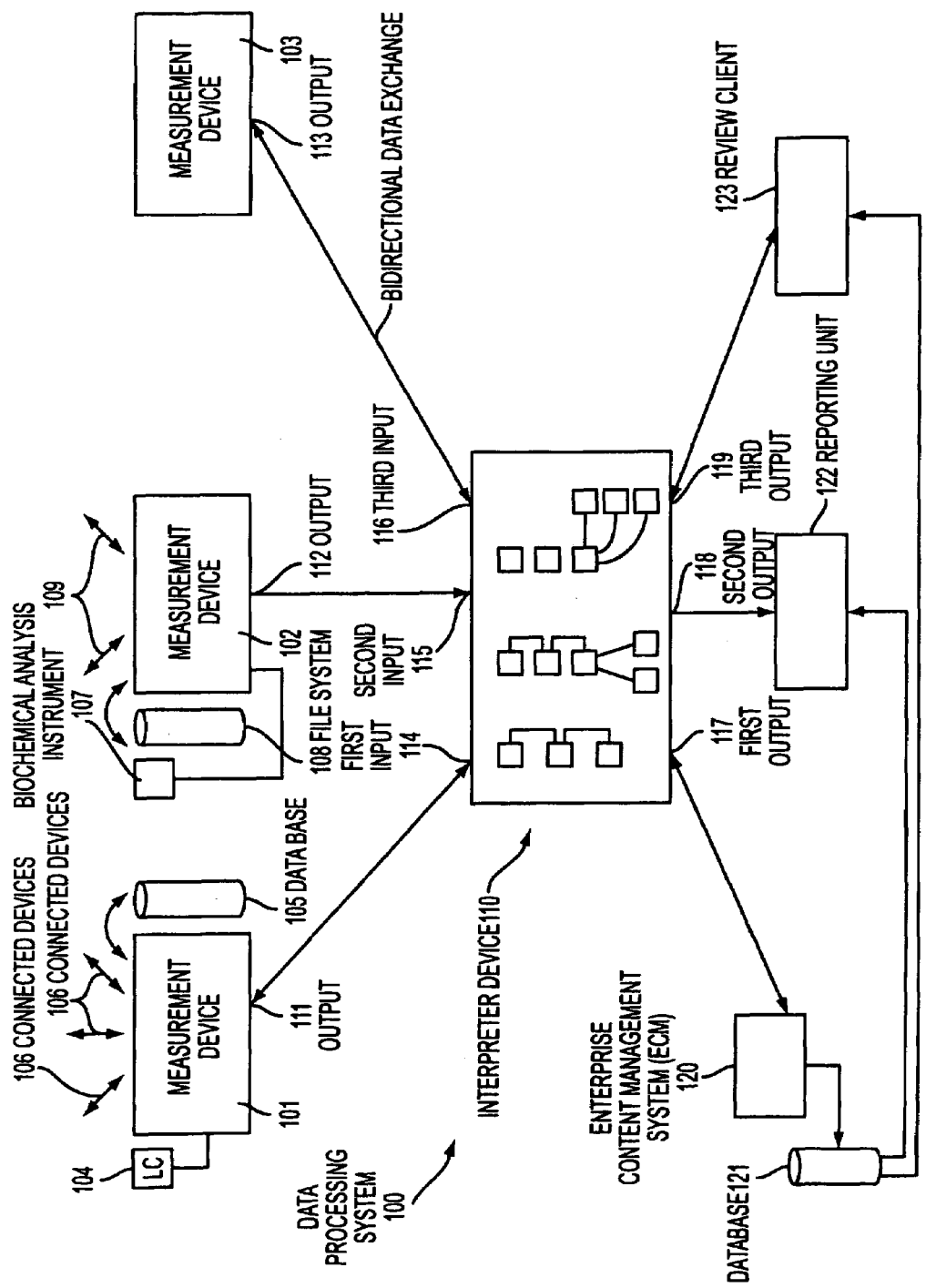
FIG. 1A illustrates a data processing system according to an exemplary embodiment.

The drawings generally show schematic representations.

DETAILED DESCRIPTION OF THE DISCLOSED EMBODIMENTS

In the following, referring to FIG. 1A, a data processing system 100 according to an exemplary embodiment will be described.

The data processing system 100 comprises an interpreter device 110 for converting input data provided by a plurality of measurement devices 101, 102, 103 into output data provided in a unified data format.

In the present example, the first measurement device 101 comprises an LC instrument 104 of the 1100 Series of Agilent Technologies which is connected to a Cerity© block which is a software running on a PC which generates measurement data of the first measurement device 101. The measurement device 101 is connected to a database 105, for instance an Oracle© database, which is capable of storing data according to the Cerity© schema. Thus, the measurement data generated by the measurement device 101 is in a proprietary format, that is to say in a special format related to the Cerity© software. As indicated by arrows 106, data generated by the first measurement device 101 may be provided for further processing by connected devices, may be provided for generating reports, and may be provided for being stored in a Cerity© archive.

In the present example, the second measurement device 102 comprises a biochemical analysis instrument 107 and a ChemStation© software block. Data generated by the second measurement device 102 may be stored in a file system 108 in a proprietary format which may differ from the proprietary format in which data are provided by the Cerity© software. Furthermore, as indicated by arrows 109, the data generated by the ChemStation© block may be used for generating reports, etc.

Further shown in FIG. 1A is the third measurement device 103 which may be any measurement device generating data in any proprietary format.

Summarizing, the data provided at an output 111 of the first measurement device, at an output 112 of the second measurement device 102, and at an output 113 of the third measurement device 103 may be each provided in different formats.

As can be seen in FIG. 1A, the output 111 is connected to a first input 114 of the interpreter device 110, the output 112 is connected to a second input 115 of the interpreter device 110 and the output 113 is connected with a third input 116 of the interpreter device 110. As indicated by the double arrows between reference numerals 111 to 116, a bidirectional data exchange (read/write) is enabled.

The data provided by the outputs 111 to 113 are each in different proprietary formats and may or may not include any pre-evaluation or pre-processing of the data.

The interpreter device 110 is now capable to convert the input data provided at the inputs 114 to 116 into output data which are each in a unified data format. This data format which may also be denoted in the following as ACAML ("Agilent Common Analytical Markup Language") is a standardized data format, or in other words a normalized data schema which is based on XML (Extensible Markup Language). Thus, at outputs 117 to 119 of the interpreter device 110, the data are provided in a transparent data format with relational data linking. Hence, an emulation with XML may be performed.

All analytical data provided by the measurement devices 101 to 103 are thus provided in a common structure at the outputs of the interpreter device 110. Thus, the data may be provided, if required, in application and technology specific areas. The interpreter device 110 extracts/filters data out of the input data, so that output data are free of any interpretation.

As shown in FIG. 1A, the data processed by the interpreter device 110 is provided at first to third outputs 117, 118 and 119 of the interpreter device 110. The data provided by the measurement devices 101 to 103 may be processed sequentially or simultaneously by the interpreter device 110, and may be provided at the outputs 117 to 119 sequentially or simultaneously.

In the following, it is assumed that the presently processed data originates from the first measurement device 101 and is provided, after processing by the interpreter 110, at each of the outputs 117 to 119.

The first output 117 is coupled to an Enterprise Content Management system (ECM) 120 which is a storage memory storing the data provided at the first output 117 with an index so that data items can be retrieved with low computational burden (attribute extraction). The Enterprise Content Management system 120 can be a central server instance, in which a user may log in.

The ECM 120 is coupled to a database 121 which is capable of representing the data provided by all systems 101 to 103 in one and the same unitary data format. The data provided to the ECM 120 and to the database 121 are measurement device independent so that it can not be derived from this data which of the measurement device types 101 to 103 has generated this data.

The database device 121 is connected to a reporting unit 122 which is also coupled to the second output 118 of the interpreter device 110. The reporting unit 122 is capable of reporting the result of the measurement in the form of a paper print or a PDF file. Thus, the reporting unit 122 may be a cross sample application.

Furthermore, an output of the database 121 and the third output 119 of the interpreter device 110 are coupled to a review client 123 (for instance an HTML browser) which may provide a viewer which may present, for instance in a graphical manner, the result of a measurement in a reconditioned manner. In other words, the review client may post-process the data provided thereto to display these data to a user.

Summarizing, each of the measurement devices 101 to 103 supplies, to the inputs 114 to 116 of the interpreter device 110, the data in a respective proprietary format. The interpreter unit 110 recognizes the origin and the format of the data provided from the measurement devices 101 to 103 by means of software components embedded in the interpreter device 110 and converts the data provided in the proprietary formats into a unified format. The resulting data may then be brought in the format of an XML file, which is based on the ACAML-schema.

In the following, referring to FIG. 1B, a data processing system 150 according to an exemplary embodiment will be described.

Figure 1B:
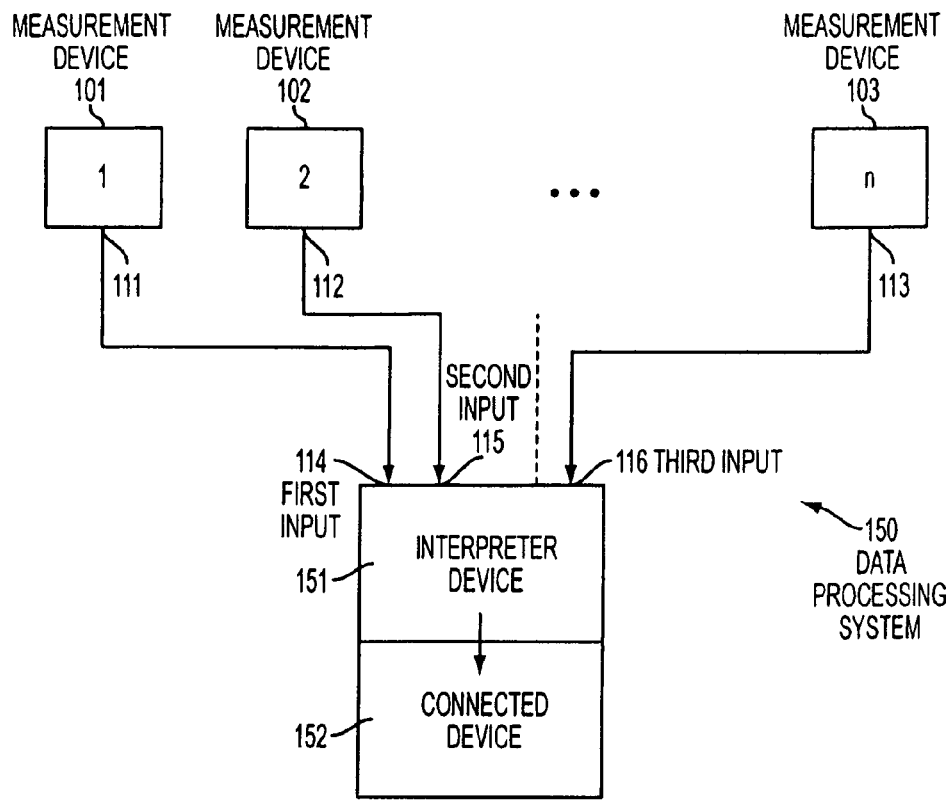
FIG. 1B illustrates a data processing system according to an exemplary embodiment.

In FIG. 1B, an interpreter device 151 is connected to a plurality of measurement devices 101 to 103 and converts the proprietary measurement data provided at inputs 114 to 116 of the interpreter device 151 into output data in a unitary data format which is provided to a connected device 152 for further analysis. The connected device 152 may post-process the measurement data and may present the data to a user in a reconditioned manner.

In the structure of FIG. 1B, one common interpreter device 151 is provided for all of the measurement devices 101 to 103.

Figure 1C:
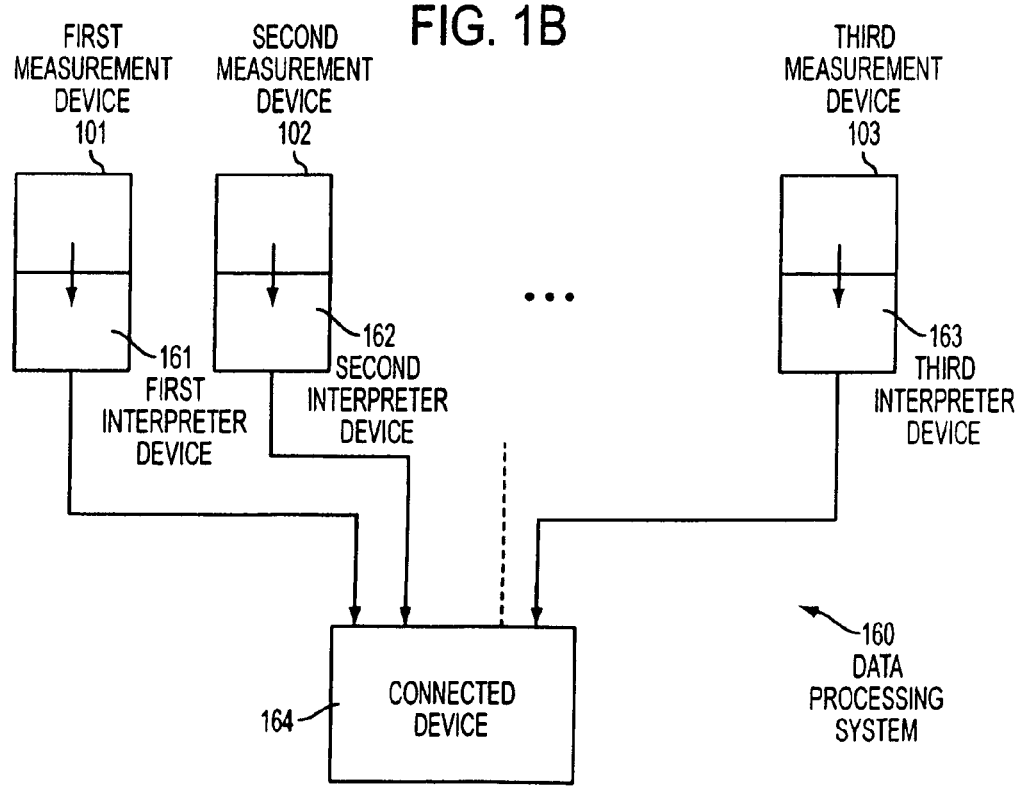
FIG. 1C illustrates a data processing device according to an exemplary embodiment.

In contrast to this, in case of the data processing system 160 shown in FIG. 1C, a first interpreter device 161 is coupled as a module to the first measurement device 101, a second interpreter device 162 is inserted as a module in the second measurement device 102, and a third interpreter device 163 is inserted as a module in the third measurement device 103.

By taking this measure, the data of the measurement devices 101 to 103 which are generated in proprietary formats are converted, internally in the measurement device, into a unified data format which is provided at the outputs of the arrangements 101, 161 or 102, 162 or 103, 163. These data may be provided to a connected device 164 for further processing. The connected device, similarly to the connected device 152, needs not to have the capability to understand data in different formats, but may simply be capable of understanding the unitary format of the data.

In the following, referring to FIG. 2, a data container and ACAML system 200 will be described.

ACAML is the short form of Agilent Common Analytical Markup Language.

The system 200 relates to the data storage, interchange and processing with the common generic analytical data container.

Figure 2:
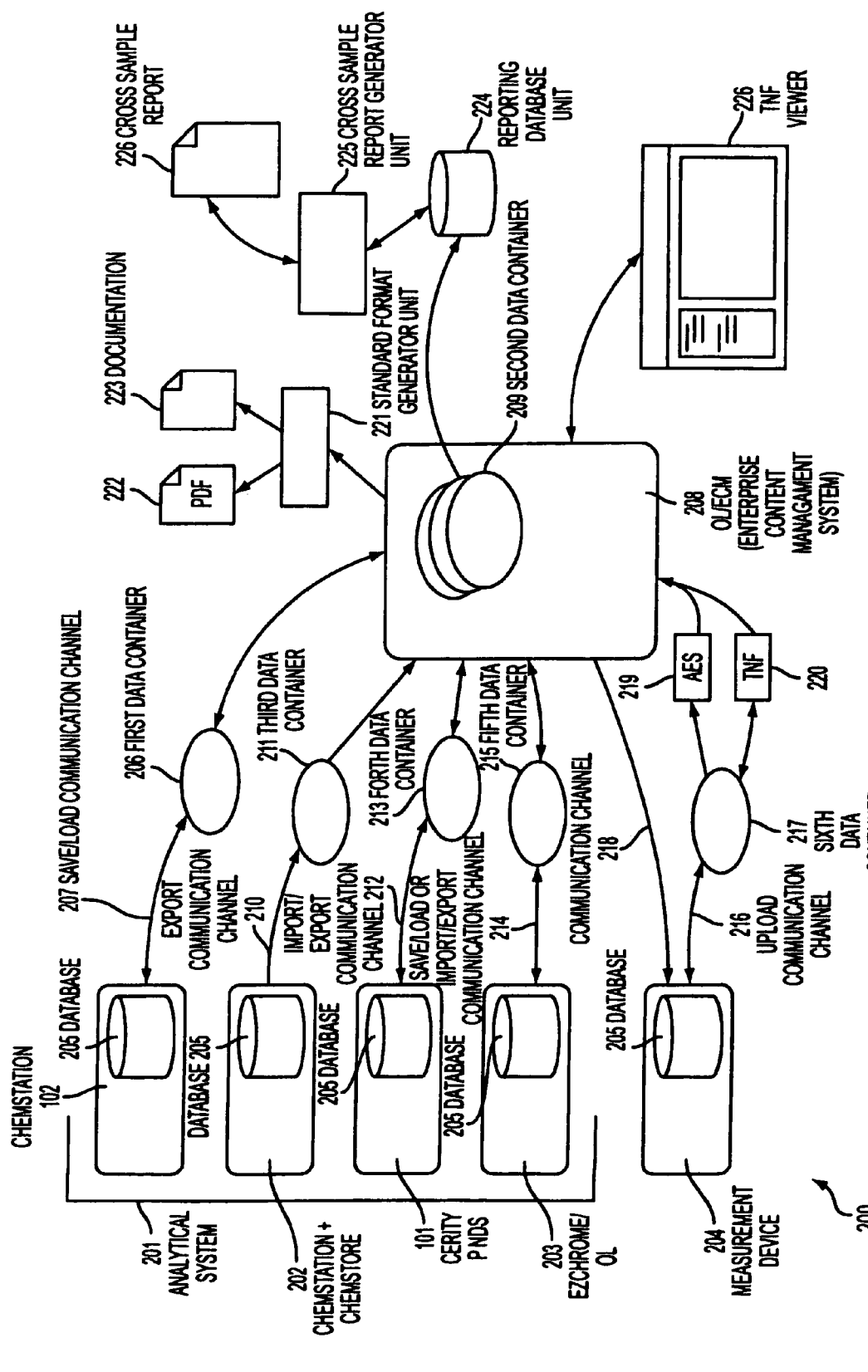
FIG. 2 illustrates data storage, interchange and processing with a common generic analytical data container.

As can be seen in FIG. 2, an analytical system 201 is provided which comprises a plurality of analytical devices of the company Agilent Technologies. This includes a ChemStation© device 102, a ChemStation© device+ChemStore© device 202, a Cerity© P NDS device 101, an EZChrome/OL© device 203. Furthermore, a further measurement device 204 of any other company is connected to the system 200.

Each of the measurement devices 101, 102, 202 to 204 comprises an assigned database 205. The ChemStation 102 is connected to a first data container 206 via a save/load communication channel 207. The first data container 206 holds the complete set of original ChemStation data with all revisions for samples or sequences. It includes all signal traces, the spectra acquired during the runs and metadata plus one TNF file. This can be restored in the original system without loss of data quality.

The first data container 206 is connected to an OL/ECM (Enterprise Content Management system) 208 including a second data container 209 (TNF plus related data files).

The ChemStation© device+ChemStore© device 202 is connected via an export communication channel 210 to a third data container 211. The second data container 211 is again coupled to the OL/ECM 208.

Furthermore, the Cerity© P NDS device 101 is coupled via an import/export communication channel 212 to a forth data container 213 which, in turn, is coupled to the OL/ECM 208. Data from a retired ChemStore© system may be reprocessed in a Cerity© P NDS device without loss of data quality in the channel 212.

Furthermore, the EZChrome/OL© device 203 is coupled by a save/load or import/export communication channel 214 to a fifth data container 215 which is, in turn, coupled to the OL/ECM 208. Once an "old" Agilent system is retired all data needs to be reproducible in the EZChrome© device without loss of data quality.

Also the measurement device 204 is connected, via an upload communication channel 216, to a sixth data container 217.

Furthermore, an import of data from the OL/ECM 208 to the measurement device 204 is possible via a communication channel 218.

The sixth data container 217 is coupled via an AES unit 219 to the OL/ECM 208, and is coupled via a TNF creation unit 220 to the OL/ECM 208.

The OL/ECM 208 is coupled to a standard format generator unit 221. The standard format generator unit 221 generates a PDF output file 222 and a documentation 223. Furthermore, data may be extracted from the data container 209 to a reporting database unit 224 for reporting purposes. The reporting database 224 is further coupled to a cross sample report generator unit 225 which may generate a cross sample report 226.

Beyond this, the OL/ECM 208 is coupled to a TNF viewer 226 which is capable of displaying all content of data containers.

Thus, the system 200 is capable of describing content with link to files. ACAML is used as XML relational database in a data container.

Figure 3:
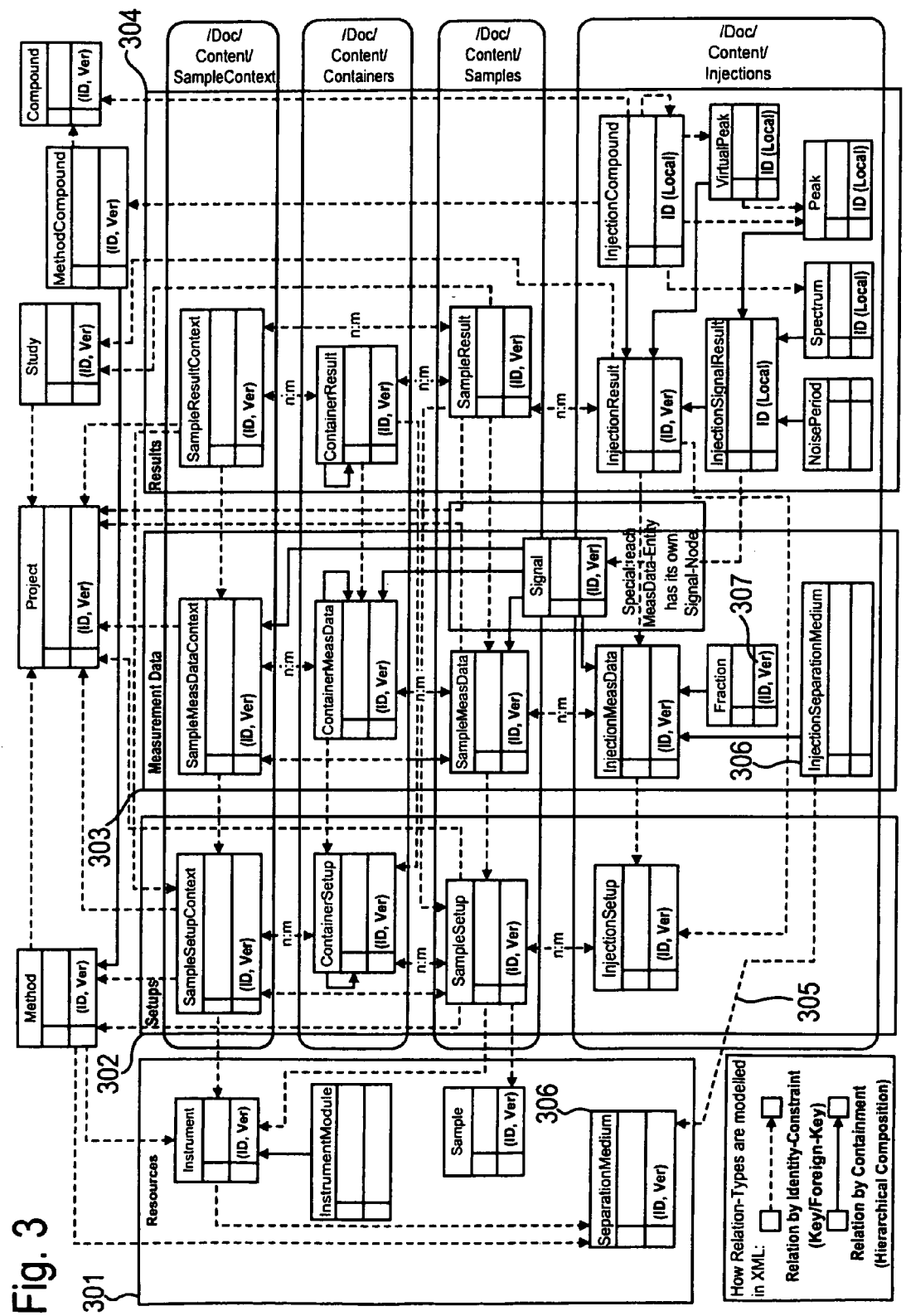
FIG. 3 illustrates a data structure of a data processing device according to an exemplary embodiment.

FIG. 3 shows an example of a data structure of output data in the ACAML format.

As can be seen schematically in FIG. 3, the output of a data processor yields a data structure in which a plurality of output data item groups 301 to 304 are provided in a unified data format and are coupled with a relational linkage of output data items 306 forming the output data item groups 301 to 304. The output data items 306 are logically linked by means of unidirectional or bidirectional pointers 305 which point from a first data block 306 to a second block 306, and or vice versa. Thus, also a non-hierarchical coupling of the different data blocks 306 is possible. Links between output data items 306 may be provided internally of a particular one of the output data item groups 301 to 304 or between different output data item groups 301 to 304.

The output data item groups include a measurement resource data item group 301, a measurement setup data item group 302, a measurement data item group 303, and a measurement result data item group 304. By the combination of these item groups, even a complex measurement may be defined or mapped into a logical structure.

Some or all of the data item blocks 306 may have an assigned unique two-dimensional identifier 307 comprising an identifier ID and an additional code VER (which may, for instance, define a version).

In the following, an exemplary embodiment of a system for providing a unitary data format for measurement devices will be described in detail.

First, an overview over a unified data schema will be given.

The "Agilent Common Analytical Markup Language" (ACAML) is designed to describe all kinds of data, which exists in analytical environments. An approach is to define a technique- and application-independent unified schema-language. ACAML can be used to describe analytical data in a generic way, without any special aspects (e.g. result-centric viewpoint): starting from a single instrument or method up to a complex scenario with multiple instruments, methods, users and hundreds or thousands of samples.

Next, the usage of industrial standards will be explained.

As a base for ACAML the industrial XML-standard may be used. An XML-standard-schema describes all element-types, entities and relations between these objects. The ACAML-schema is strong-typed:

to support the idea of standardized data-exchange; and
to avoid uncontrolled growth of self-defined types, which may make an automated further processing complicated or even impossible.

The schema-definition may make sure that each instance-document is well defined and the referential integrity between all objects is guaranteed. Additional applications (like a special ACAML-validator) may be dispensible to handle and validate ACAML instance-documents.

The main entities of a typical analytical context can be classified into

Resources (measurement instruments, analyt separation columns, microfluidic chips, etc.),
Setup-, Measurement- and Result-Data,
Library (Compounds, . . . ),
Misc. like Methods, Projects, Users, Studies, etc.

This classification may help to identify the common entities, which are used regardless of the specific technique and application, when an analytical scenario is described.

These entities may define the core of ACAML. Of course there exist several other entities in ACAML, but for simplification and clearness, such additional topics are left out at this point.

Figure 4:
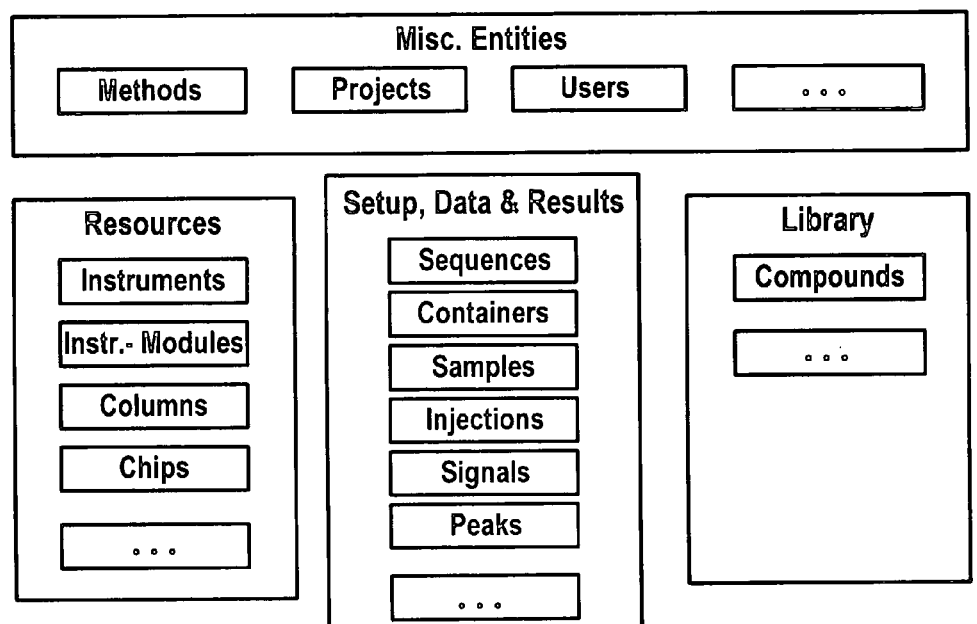
FIG. 4 illustrates the main entities of an analytical contexts and their classification.

FIG. 4 illustrates main entities and their classifications in an overview:

The development of the ACAML-schema is based on following paradigms, which are implemented in most parts:

(1) Each entity is defined by a specific XML-type (strong-typed schema).

(2) Each ACAML-file has the same document-structure: Header (common information & documents-ID), Content (the "real" analytical data"), Checksum (optional).

(3) It exist only one top-level element as defined document-root.

(4) Each versioned object has a unique 2-dim. key as attribute:

id: any text (e.g. Guid) ver: numeric (0 for base version/no version)

(5) Each entity, which is based on a versioned object, can hold the following basic information: name and description, create- and modify-information, audit-trail-records, binary-data (embedded or as reference to file), custom-fields (6) Each non-versioned object has a unique 1-dim. key as attribute: id: any text (e.g. Guid).

For a non-versioned object it is not required that the key is unique in the scope of the whole document. For most non-versioned entities, the key should be unique in scope of a defined element.

(7) The specific information of a specialized object is located following:

common attributes:→on top-level of object, technique-specific attributes, which apply only to one technique (like LC or MS):→in typed "TechSpec"-subnode, application-specific attributes, which apply only to one application (like a ChemStation© application):→in typed "AppSpec"-subnode.

(8) Usage of concepts like inheritance, specialized types, aggregation to: provide a clear and structured design, re-use type-definitions, provide a better maintenance by common base-classes.

(9) Usage of relational concepts like plain types, avoid inheritance, broad common types, avoid specialization, design relations db-like with integrity-constrains (xs:key, xs:keyref) to: have a file-based "db-snapshot", deduct easier a real db-schema from ACAML.

In the following, the architecture (Setup/Measurement-Data/Results) of the system will be described.

First, the main analysis entities will be explained.

An analysis-scenario comprises objects of four different levels, which are related together and hold distributed information of different granularity. Four ACAML-levels are:

(1) Sample Context: This level holds information about the context, in which a sample is placed (e.g. "Sequence", "Single-Sample". Typically a "SampleContext" contains environment-information, which is valid for all samples in the context. A sample-context can have assigned containers and/or samples).

(2) Container: This optional level may make it possible to describe physical containers for samples like e.g. plates or trays. Also logical composition can be described like e.g. sub-sequences. It is possible to create recursive structures with containers. That means, one container can have assigned one or more sub-containers. The "bottom-level"-container can have samples assigned.

Figure 5:
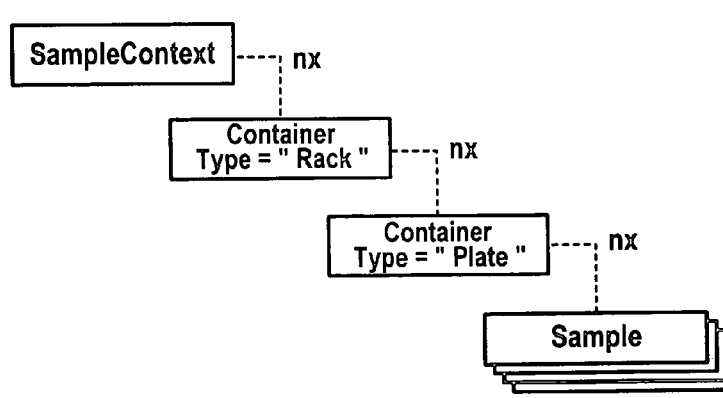
FIG. 5 illustrates an example for the usage of a container level.

An example for usage of the container-level is given in FIG. 5.

(3) Sample: This level describes a technical sample, which attributes are typically a vial-position, injection-volume and number of injections. A sample can have assigned 1 to n injections.

(4) Injection: Here the real injection is placed. Information about e.g. the real injection-amount and the detected compounds can be found here. Under this injection the detector-signals are placed. Each injection can have n signals.

In the following, relations of analysis levels will be explained.

The relation-cardinality of this four main-levels is "n:m". This may be suitable to support strong-versioned systems.

Figure 6:
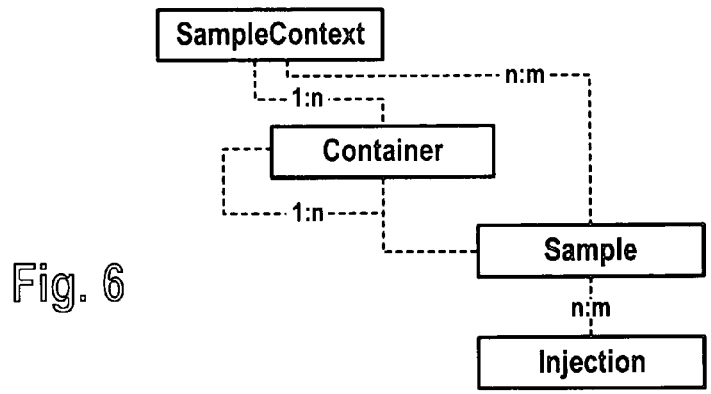
FIG. 6 illustrates a relational model of main levels.

FIG. 6 illustrates a relational model of main-levels.

A versioned object can have assigned one logical parent, which has more then one physical version. This happens especially in systems with strong versioning, when a sample-context is changed, but the samples in the context not. So each sample is member of two sample-contexts: the original, unchanged and the modified.

Figure 7:
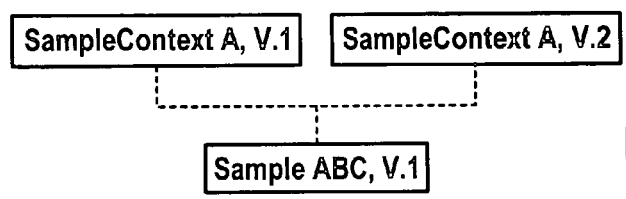
FIG. 7 illustrates an "n:m"-relation of sample context and sample.

FIG. 7 illustrates an "n:m"-relation of sample context and sample.

In the following, additional global entities will be explained.

These entities are placed a globally in the schema. The relations to the main-entities and other global entities are defined by references.

Next, method/method compound will be mentioned.

Standards for an analysis are described like: parameters for acquisition and data-analysis, default-instrument and other settings. Also a set of method-compounds can be defined, which shall be detected by this method.

Next, an instrument/instrument module will be mentioned. The logical/physical instrument and its modules are described, which is used to analyze the samples.

Next, a separation medium will be explained. It is used in instruments and methods. Typically mediums are e.g. columns or chips.

Next, a compound will be mentioned. It describes a library-compound, which attributes have standard character. A compound can be referenced by method-compounds and injection-compounds.

Next, a signal will be mentioned. This entity represents a single detector-signal or channel. Typically attributes are start- and end-time, sampling-frequency, number of data-points. Signals can be stored on sample-context, container-, sample- and injection-level.

Next, a sample will be mentioned. "The physical sample" is described. Various analysis-samples can be derived from this object.

Next, a project will be mentioned. The project describes an organizational object. Many entities can be assigned to a project. A injection, e.g., can be assigned only to one project.

Next, a study will be mentioned. The study is different from project. It is a result-centric object. Various sample and injections can be included in a study. In reverse, an injection can be included in several studies.

In the following, additional local entities will be described.

The local entities are related by containment to another entity. Under the scope of a parent-entity, local entities may have reference to other local entities in the same scope.

Next, an injection compound will be mentioned. Compounds are described, which are identified in the current injection. An injection-compound may have a link to a method-compound or to a library-compound. An injection compound can be identified by a set of other entities. Following entities can be used for this identification: peaks, virtual peaks, spectra, other injection compounds.

Next, an injection separation medium will be mentioned. It defines a link between the injection and the used medium. It contains e.g. injection-count for the medium.

Next, an injection signal result will be mentioned. This entity is placed under an injection and describes the results on a specific signal of the injection. As a result of data-analysis, an injection-signal-result can have assigned multiple peaks and/or spectra.

Next, a peak will be mentioned. Peaks are a result from data-analysis on a signal. Each peak can have a large set of attributes like retention-time, height, area, etc.

Next, a virtual peak will be mentioned. Virtual-peaks can be assembled by a set of peaks. Typically created by data-analysis, to aggregate various aspects from different peaks into one virtually created peak.

Next, a spectrum will be mentioned. A spectrum has attributes like retention-time, expression-type etc. It represents a two-dimensional slice from a three-dimensional signal.

Figure 8:
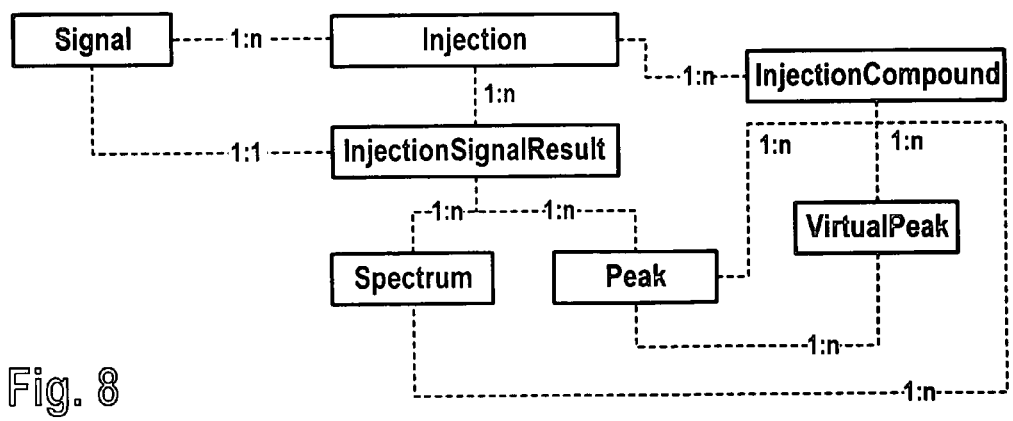
FIG. 8 illustrates relations of local entities.

Relations of local entities are illustrated in FIG. 8.

In the following, a base type concept will be explained.

To provide a better maintainable type-system, all global main entities and most of the local entities are derived from a set of base-types. These base-types implement different functionalities, like a key, a version-number, storage of binary-data, object information, etc.

The two main branches are non-versioned and versioned objects: Non versioned objects: Base-type for all objects, where a single id as key satisfies the requirements for safe identification. Versioned object: Base-type for all objects, where an id and a version as key-tuple is required, to identify that object.

Figure 9:
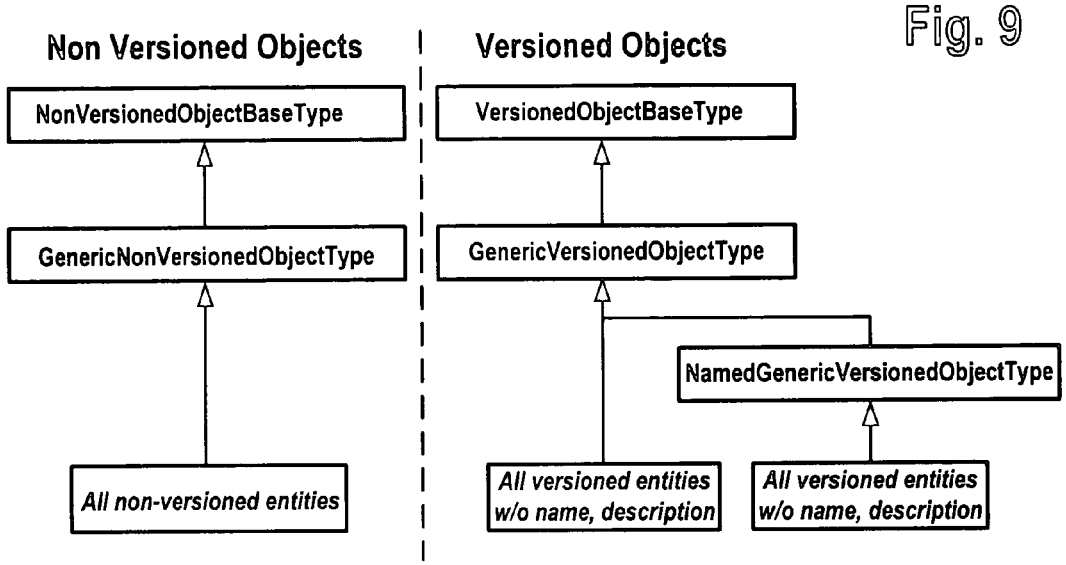
FIG. 9 illustrates a hierarchy of base types.

For these two branches, the type-hierarchies illustrated in FIG. 9 are used:

In the following, the "3-Column-Design" will be explained.

The generic lifecycle of an analysis-scenario can be divided in following steps:

Setup and configure. Enter all samples and parameters. Make analysis "ready to run".

Run analysis with setup from step 1 and acquire measurement-data from instruments/devices.

Run data-analysis on data, which was acquired in step 2. Use, if required, data-analysis-parameters from step 1.

Figure 10:
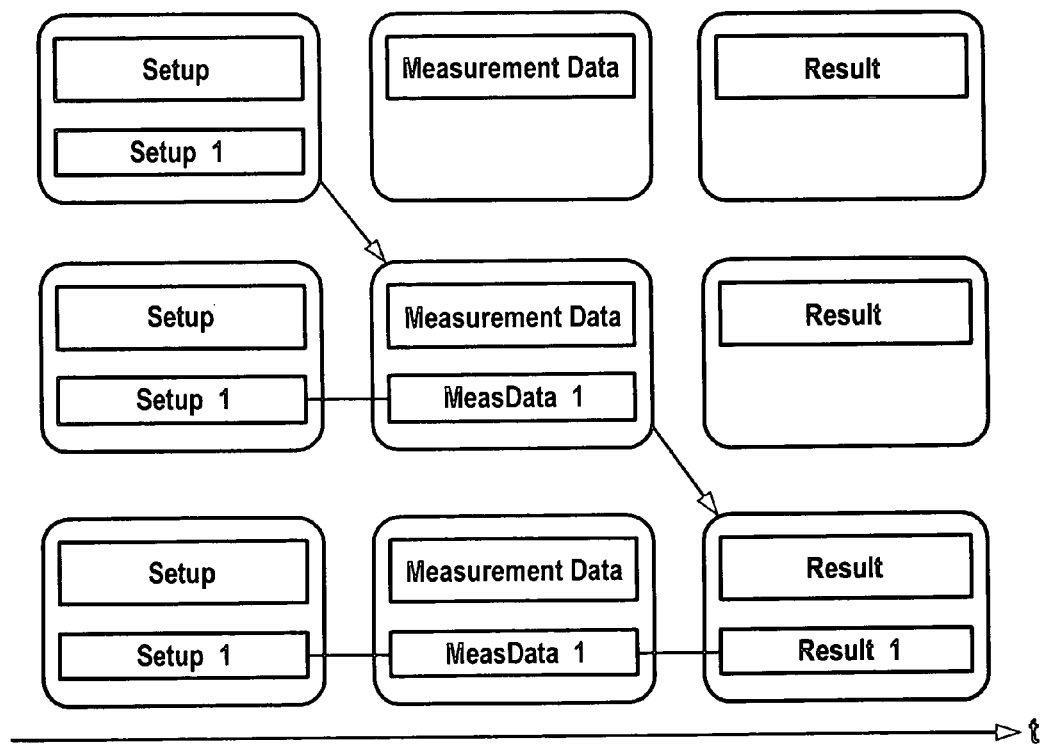
FIG. 10 illustrates lifecycle steps of an analysis.

FIG. 10 illustrates the lifecycle-steps of an analysis.

According to these lifecycle-steps, the information is split into three columns:

Column 1—"Setup": Keeps all information, which is used and required to setup an analysis-run. These are typically parameters for instrument, acquisition, job-layout and data-analysis.

Column 2—"Measurement-Data": Keeps the binary-data, which is received from an instrument or device. This can be detector-signals, diagnostic-signals, instrument-error-messages etc.

Column 3—"Result": Keeps all information, which is generated by processing the measurement-data with parameters from the setup, like peaks, components, custom-calculator- and group-results.

Next, the relationship between the three columns will be explained.

The simplest relation between these three steps is that one setup creates one set of data, which creates one result. But step 1 can be also used two or more times to generate data. Also a set of data can be processed several times to produce two or more results.

To design a flexible and open schema and to serve the above case, the "1:1-relationship" between setup-, measurement-data and result is broken. So 1:n-relations between setup, measurement-data and results can designed in ACAML.

Figure 11:
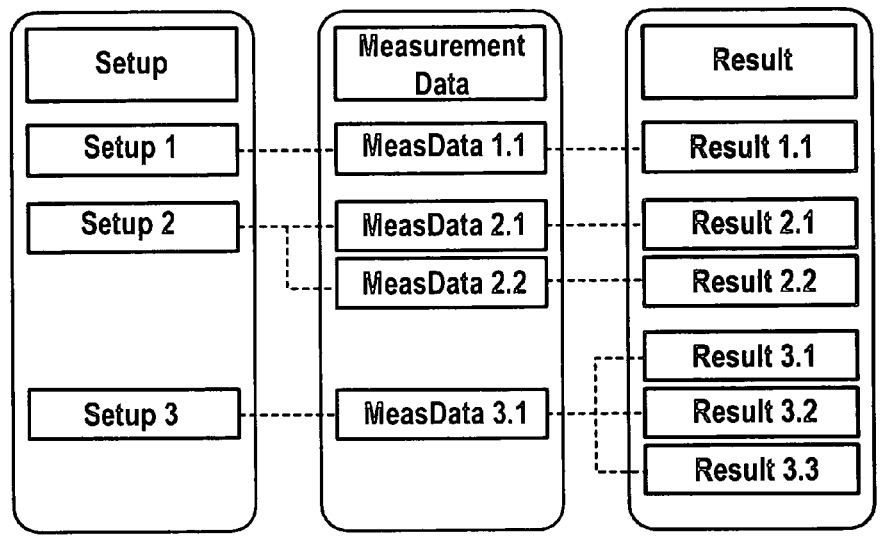
FIG. 11 illustrates "1:n" relationship between setup, measurement data and results.

The dependencies between these three levels are shown in FIG. 11, particularly "1:n"-Relationship between Setups, Measurement-Data and Results.

In the following, the network of "Analysis-Core-Objects" will be described.

The design-methodologies described above are combined into a network of analysis-core-objects. This network distributes the information of an analytical scenario over a "5×3-Matrix" based on five analysis-levels and three lifecycle-columns. The corresponding ACAML-entity-names are written in "italic" in the Squares in FIG. 12.

In the following, the parameter-handling will be explained.

The dataflow of parameters is normalized for all four levels (sample-context, container, sample, and injection).

Parameter Lifecycle

As described before, each level is cut into three columns: setup, measurement-data and result. Between these three columns of every level, the lifecycle of a specific parameter in one level, can be separated into following states:

1. Creation: The parameter is defined with initial value. This is typically done in the setup-column.

2. Redefinition: The initial setup-value is overwritten. This can happen e.g. during acquisition of measurement-data or e.g. immediately before reprocessing the results in the data-analysis.

3. Usage: The parameter-value (initial or overwritten) is used to control the instrument or to create data-analysis-result. After usage, the parameter-value is invariant, to keep track, how the measurement-data or result was generated.

Next, parameter blocks will be explained: To keep the complexity of parameter-handling in a maintainable manner, the parameters are classified into three different blocks:

1. Identification-Parameters: In this block, typically parameters or attributes like name, lims-ID, barcode etc. are placed. This kind of information helps to identify and/describe an object. Acquisition and data-analysis are not affected by these values.

2. Acquisition-Parameters: Here, instrument-specific attributes are placed. These values define how an instrument is controlled and the measurement-data shall be generated.

3. Data-Analysis-Parameters: This class of parameters define, how the measurement-data is treated, transformed and evaluated in the data-analysis.

Not every parameter can be classified strictly. Or it may be used first in acquisition and later in data-analysis. The solution is, that this parameters can appear in the acquisition-block as well as in the data-analysis-block.

Next, a parameter inheritance mechanism will be explained.

The parameter-lifecycle and -classification is implemented on every level in following manner: Each setup-entity has references to following parameters-blocks:

Identification-Parameter-Link,
Acquisition-Parameter-Link,
Data-Analysis-Parameter-Link.

In the setup, all initial values for all parameter-blocks are defined. With this values, the analysis-process is started.

Each measurement-data-entity has references to following parameters-blocks:

Identification-Parameter-Link,
Acquisition-Parameter-Link.

There is no link to the data-analysis-parameters, because these parameters are not required to control and perform the acquisition of data-analysis.

Each result-entity has references to following parameters-blocks:

Identification-Parameter-Link,
Data-Analysis-Parameter-Link.

The acquisition-parameters are invariant at this time of the analysis-process. So they don't appear here.

Following scenarios are possible:

The measurement-data- and result-entity overtake the default-parameter-values from the setup-entity.→All entities reference the same identification-, acq- and da-parameter-blocks.

The result-entity defines default values in the identification-, acq- and da-parameter-blocks, but the measurement-data- and/or result-entity redefine and use modified parameter-blocks.→There exists additional "private instances" of parameter-blocks, which are used from measurement-data- or result-entities.

This mechanism can be seen as an implantation of a parameter-inheritance on block-level.

Figure 13:
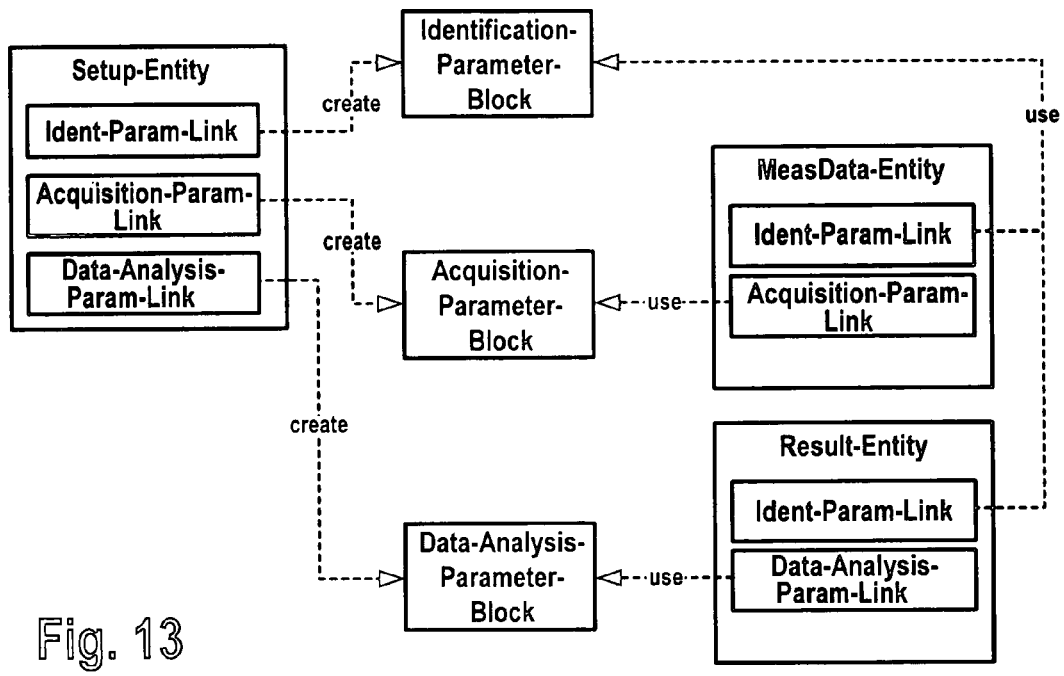
FIG. 13 illustrates a first scenario in which all entities use default parameters.

In a scenario 1, all entities use the default parameters (see FIG. 13).

Figure 14:
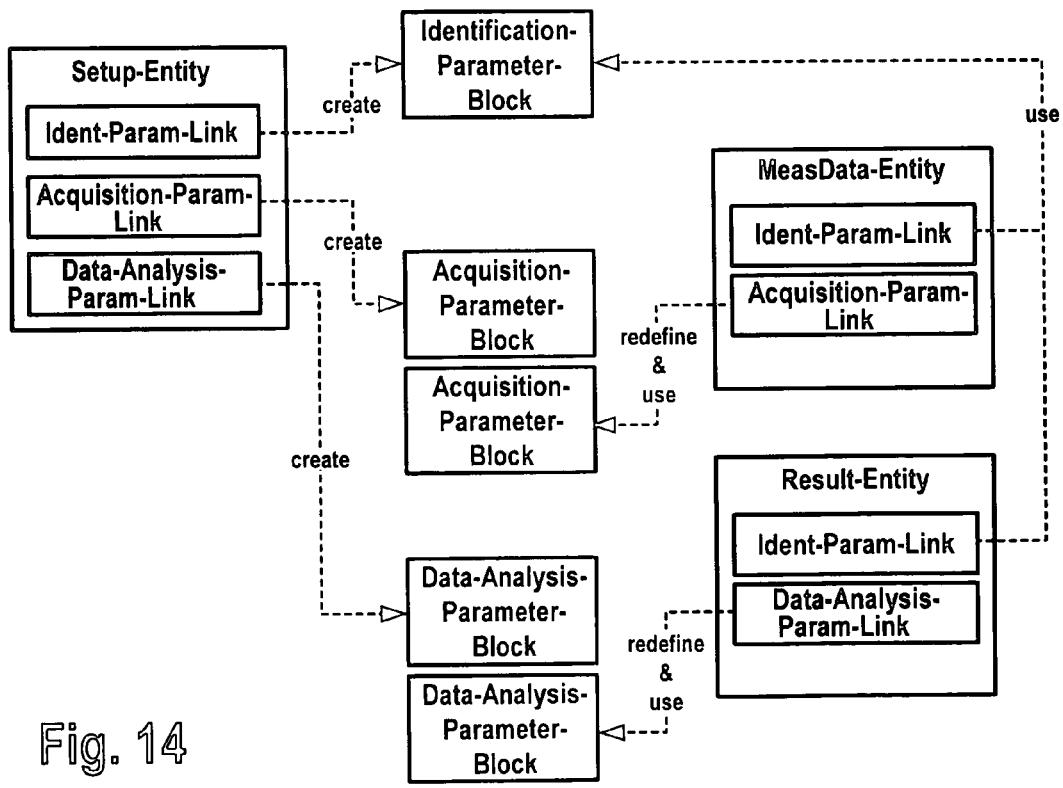
FIG. 14 illustrates a second scenario in which redefined parameter blocks are used.

In a scenario 2, redefined parameter-blocks are used (see FIG. 14).

In the following, technique- and application-specific entities will be explained.

All entities in ACAML have an attribute-set, which is designed to represent a "common denominator". Not all attributes in a specific entity must be deliverable from the source-application. To describe such super-sets of attributes helps to avoid specialization on a very early level. To handle specialized attributes, which are not listed in this common set, a naming convention and design-pattern is introduced. Two main groups of specialization can be distinguished:

Technique-specific attributes,
Application-specific attributes.

Most of the entities in ACAML have typed elements, which contain this specialized information. The naming-convention for these nodes is: "TechSpec", "AppSpec".

The element-names are same, but the element-type depends of the specific type of the parent element.

The TechSpec-Pattern has for every technique a sub-node, which a specific type like:

LC: Liquid-Chromatography
MS: Mass-Spectrometry
MF: Micro-Fluidics
CE: Capillary-Electrophoresis
UV: UV/Vis The "TechSpec"-element will exists in every case.

The element-names for the sub-nodes exist only, if technique-specific attributes exists for that type. For each *TechSpecType, the names of the technique-sub-nodes are taken from the list above. Several sub-nodes can exist under the "TechSpec"-element. That means for example, the MethodTechSpecType can have node for "LC", "MS", and "CE", and the SampleSetupTechSpecType has node for "LC" and "MF".

By this definition, one tech-spec-type can support multiple techniques in one XML-instance-document. This design enables description of data, which was generated from analysis-systems, which use multiple techniques.

Figure 15:
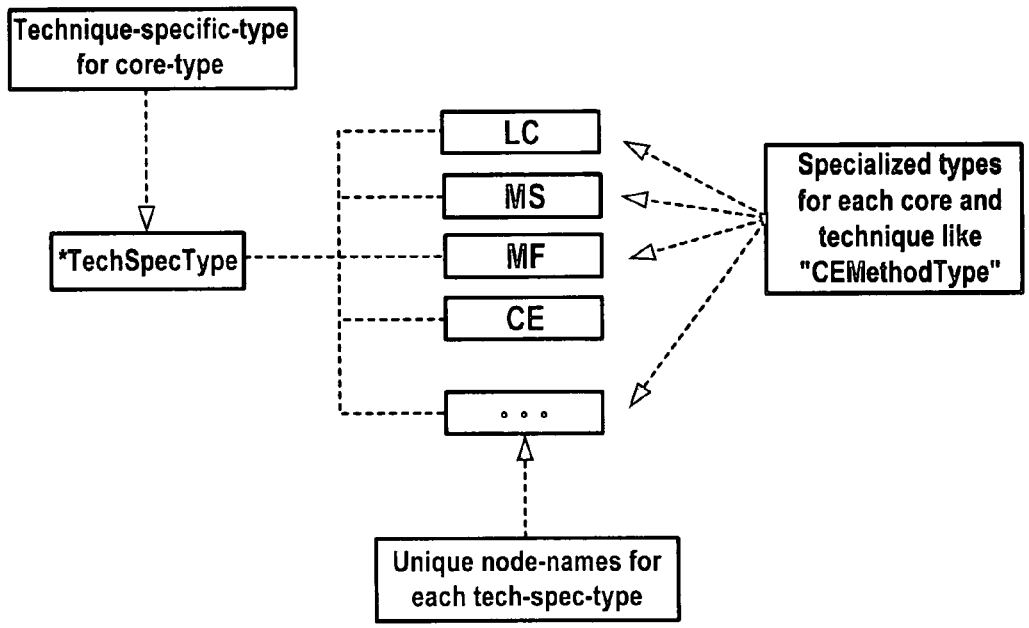
FIG. 15 illustrates a "TechSpec"-pattern.

FIG. 15 illustrates the "TechSpec"-Pattern.

The AppSpec-Pattern has for every application a sub-node like:

AgtChemStation: Agilent ChemStation©
AgtChemStore: Agilent ChemStore©
AgtCerityP: Agilent CerityP©
Generic: Generic application.

The element-names for the sub-nodes exist only, if application-specific attributes exists for that type. For each *AppSpecType, the names of the application-sub-nodes are taken from the list above.

For one application-specific-type only one sub-nodes can exists in the ACAML-instance-document. That means for example, the MethodAppSpecType can have node for "AgtChemStation" if the ACAML-instance was created from an Agilent ChemStation© application, and the node "AgtCerityP", when it was created from an Agilent CerityP© application.

One exception is the "Generic"-node. This node exists for every *AppSpecType to provide a location for un-typed data. Also can this node be overwritten by the "xs:redefine"-statement, if ACAML was taken as base in an other schema.

Figure 16:
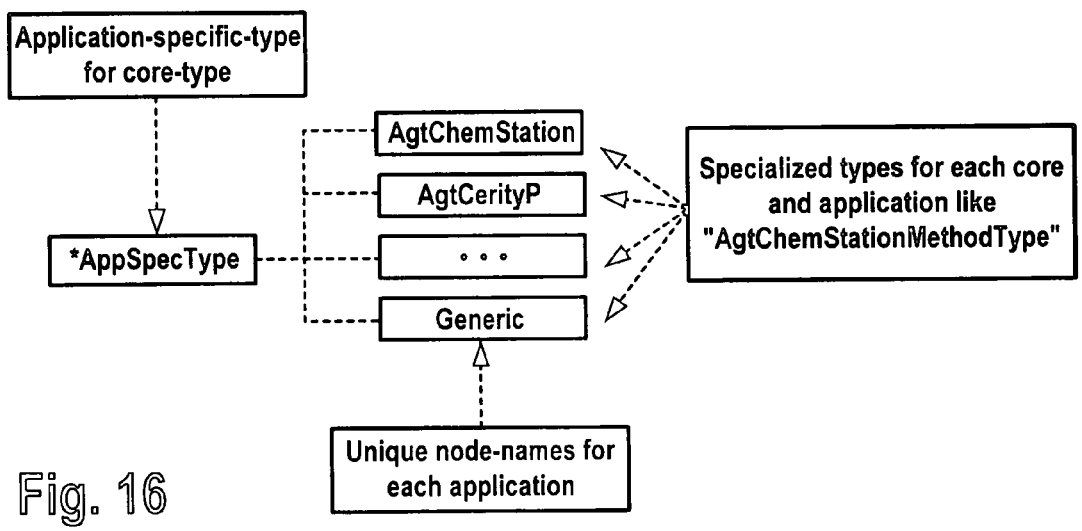
FIG. 16 illustrates an "AppSpec"-pattern.

FIG. 16 illustrates the "AppSpec"-Pattern.

In the following the ACAML-Schema will be illustrated.

In the ACAML-schema exists different sections, to structure the type-definitions and provide better maintenance.

Figure 17:
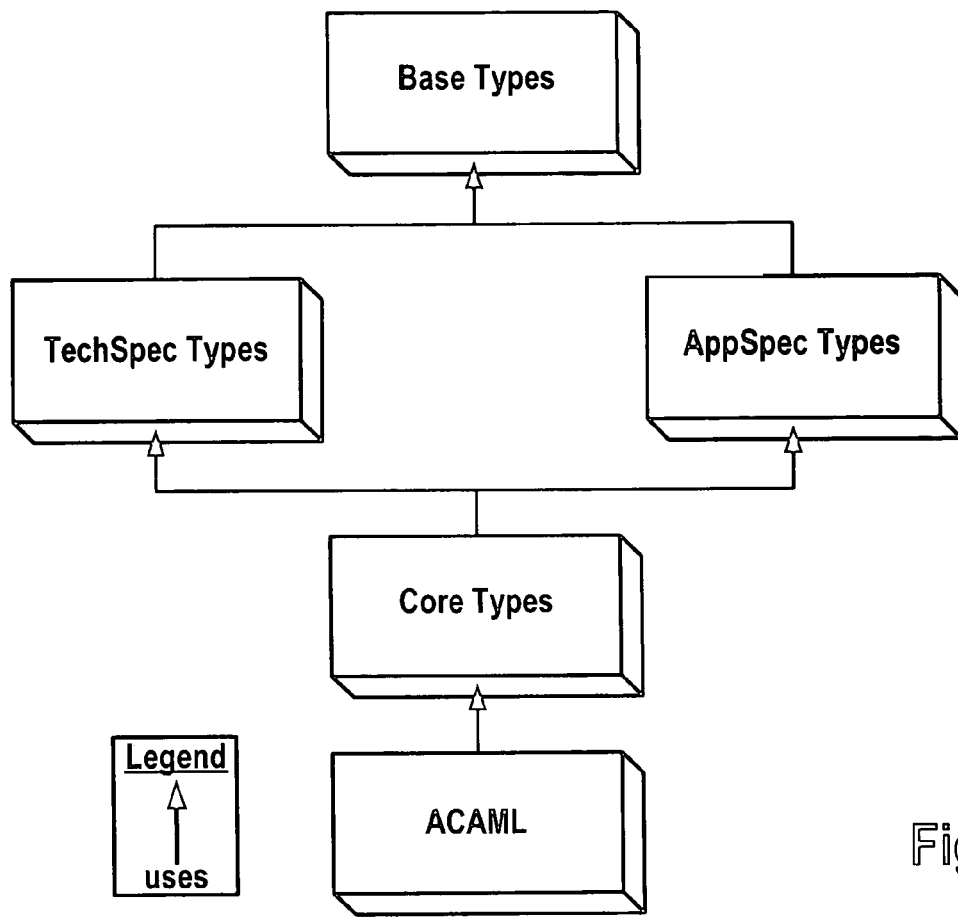
FIG. 17 illustrates the building-blocks of the ACAML-schema according to an exemplary embodiment.

FIG. 17 illustrates the building-blocks of the ACAML-architecture.

Next, a namespace definition in schema will be mentioned.

The common namespace-definition for ACAML is:

<xs:schema
    xmlns:acaml="urn:schemas-agilent-com:acaml"
    targetNamespace="urn:schemas-agilent-com:acaml" [additional attributes]>

With this definition, every ACAML-type has the prefix "acaml:".

Next, definitions in instance-document will be explained.

Concerning an ACAML-root-element, in the attribute-statement
    'xmlns="urn:schemas-agilent-com:acaml"'
defines ACAML as default namespace. This avoids placing the namespace-prefix "acaml:" before each ACAML-element-type.

The attribute-statement
    'xsi:schemaLocation="urn:schemas-agilent-com:acaml [path]\ACAML.xsd"'
can be omitted. It is only a hint for a validator, where to lookup for the schema.

The attribute-statement
    'schemaVersion=" "'
be used later for version-management and the migration-process, if the opened instance-document was created with an outdated schema-version.

<ACAML
    xmlns="urn:schemas-agilent-com:acaml"
    xsi:schemaLocation="urn:schemas-agilent-com:acaml
        [path]\ACAML.xsd"
    schemaVersion=" ">

Next, the default filename extension "acaml" will be mentioned.

To make an ACAML-instance-document identifiable by an external application, it's recommended, that "acaml" is used as file-extension. In spite of this specific file-extension, the content of the instance-document is still conforming to the XML-industrial standard and can be handled with standard XML-processing tools.

In the building-block "Base Types" all basic-types are included, like:
    scalars: IntegerType, LongType, DoubleType
    strings: StringType
    specials: BarcodeType, LimsIDType, VolumeType
    date- & time: TimePeriodType, DateTimeType Next, Entity Base Types will be described.

Figure 18A:
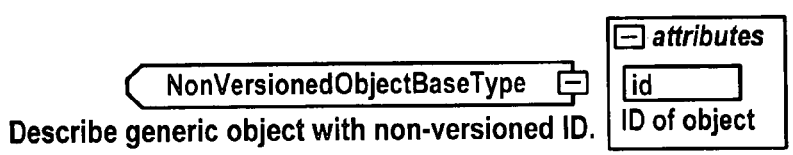
FIG. 18A illustrates non-versioned object base type.
Figure 18B:
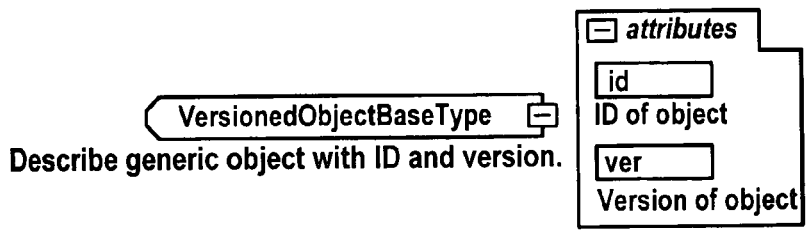
FIG. 18B illustrates versioned object base type.
Figure 19:
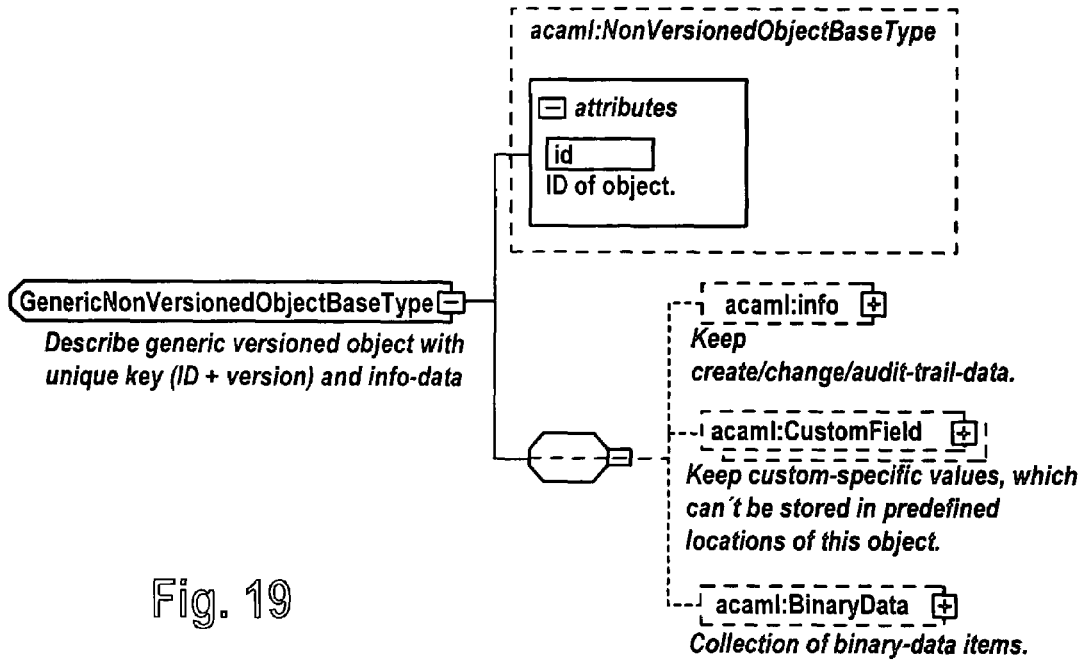
FIG. 19 illustrates generic non-versioned object type.
Figure 20:
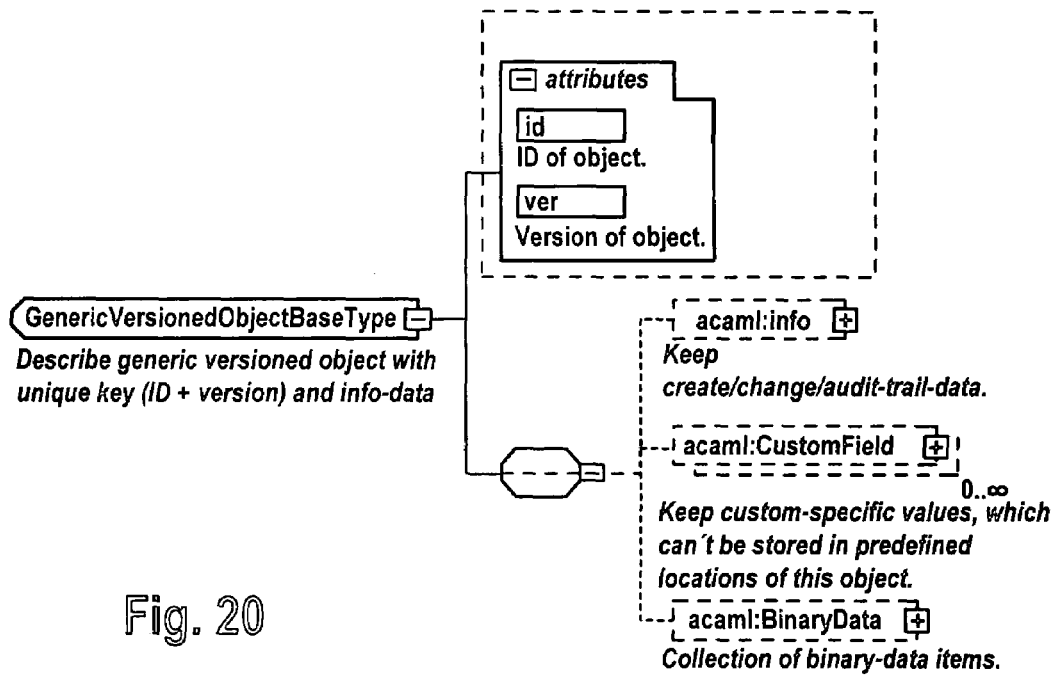
FIG. 20 illustrates a generic versioned object type.
Figure 21:
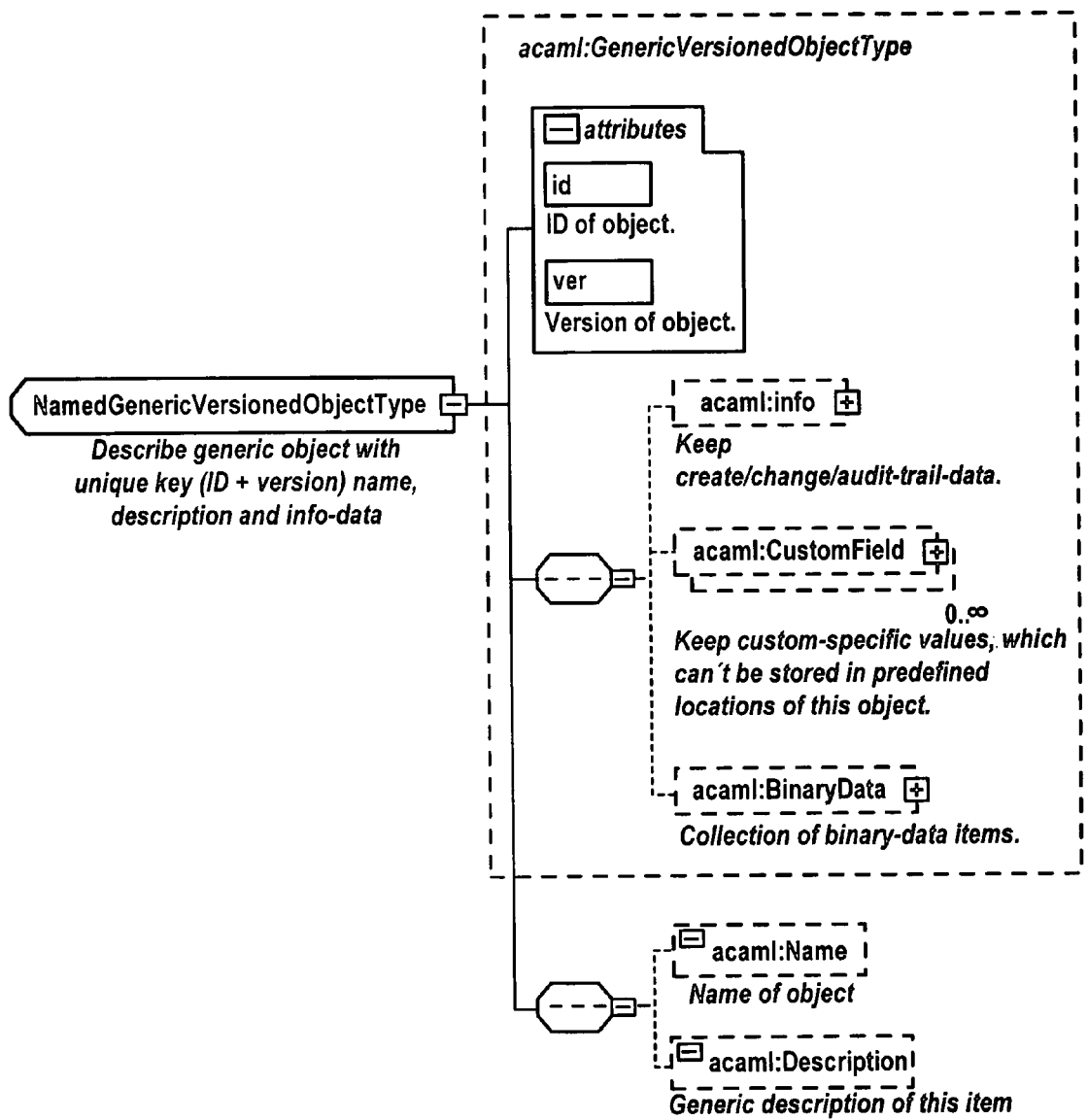
FIG. 21 illustrates a named generic versioned object type.

To provide a better maintainable type-system, all top-level entities are derived from a set of base-types. These base-types implement different functionalities, like a key, a version-number, storage of binary-data, object-info etc.
    NonVersionedObjectBase Type is illustrated in FIG. 18A.
    VersionedObjectBase Type is illustrated in FIG. 18B.
    GenericNonVersionedObject Type is illustrated in FIG. 19.
    GenericVersionedObject Type is illustrated in FIG. 20.
    NamedGenericVersionedObject Type is illustrated in FIG. 21.

Figure 22:
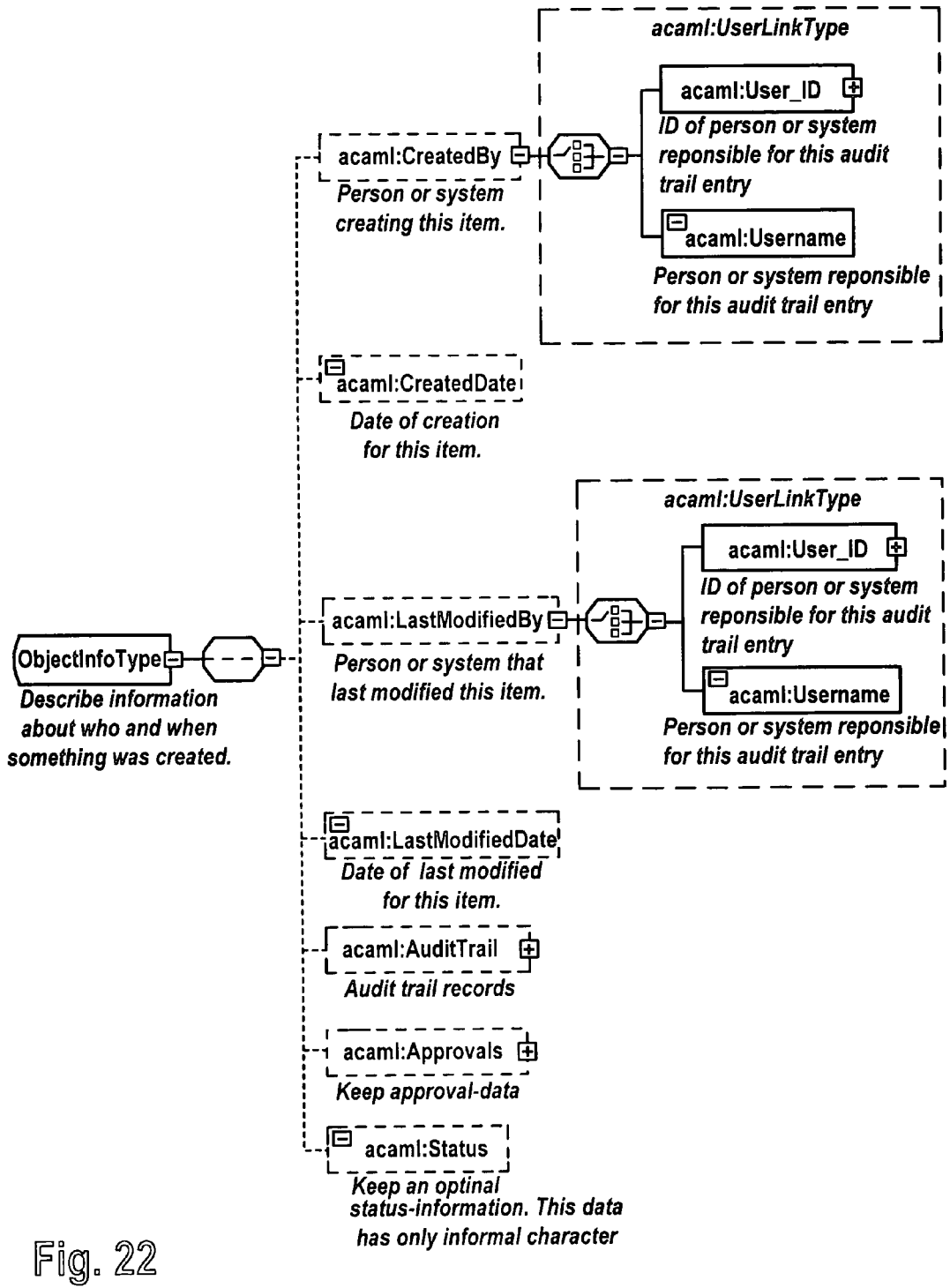
FIG. 22 illustrates an object info type.

Object Info defines a common information-block for an object. It's placed in the "Info"-element on an entity. Information about creation, modification, audit-trail and approval-state are kept in this block (see FIG. 22).

To store un-typed data, the node "CustomField" can be used. This node is from ACAML-type CustomFieldType and can store:
    key-value-pairs,
    a list of sub-ordinate custom-fields,
    any XML.

This field should only be used in exceptional cases, where no attribute of the current type will fit. Typical are custom-calculator values.

Custom-fields are critical for the consumer. Probably in most cases a automatic further processing will be very complicated, because no schema for the custom-data is defined.

Figure 23:
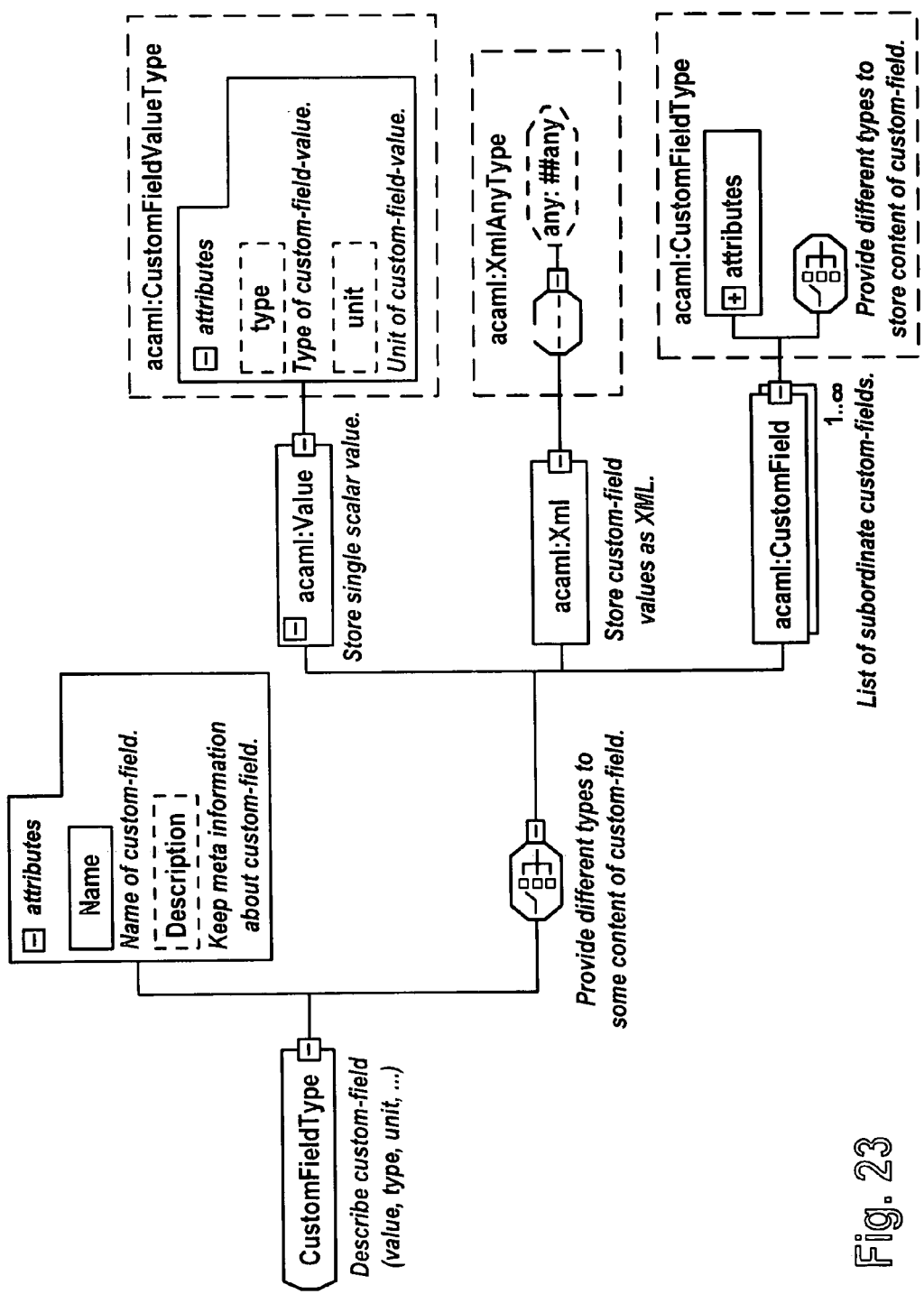
FIG. 23 illustrates a custom field type.

The CustomFieldType is illustrated in FIG. 23.

Figure 24:
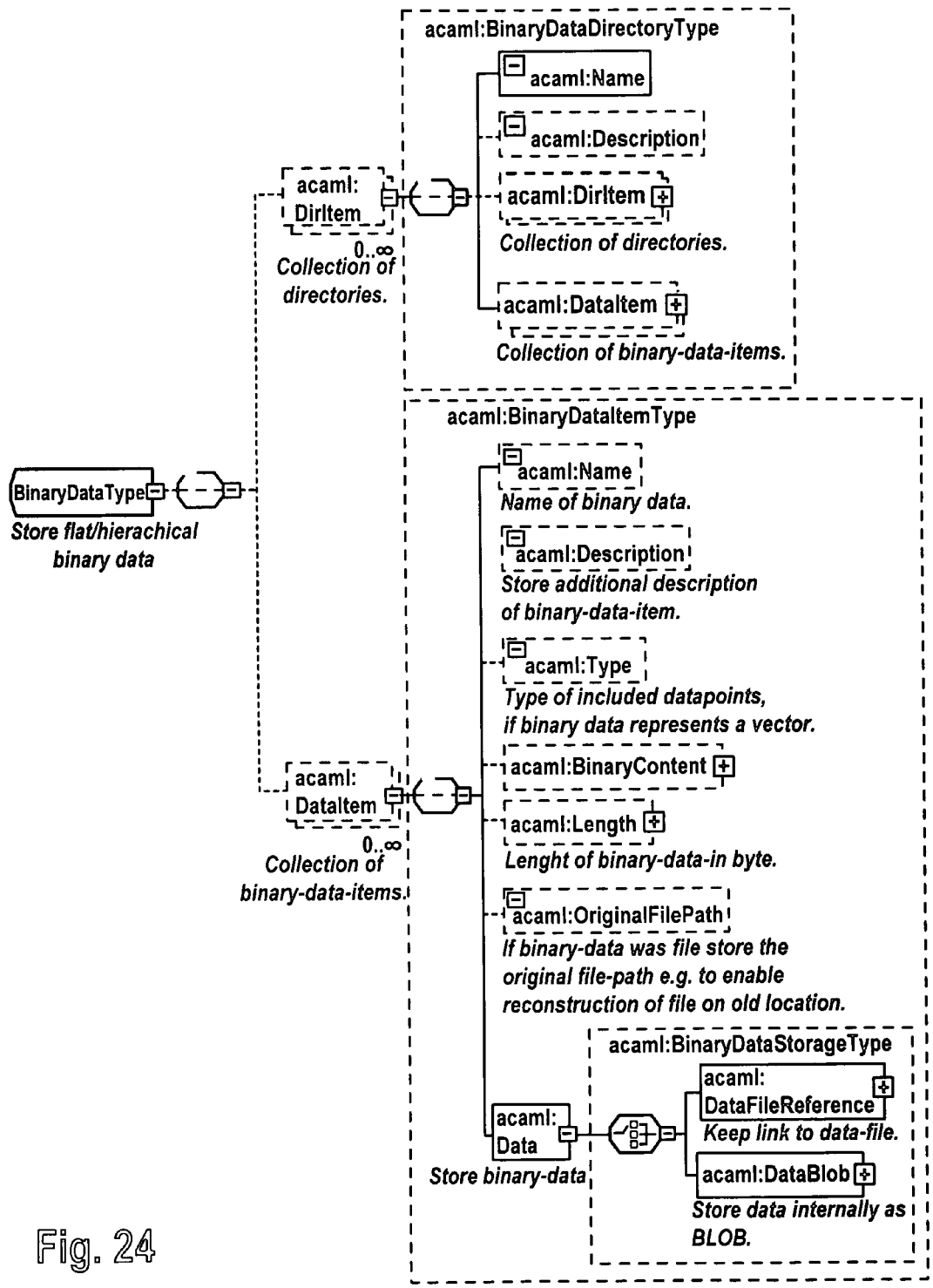
FIG. 24 illustrates a binary data type.

Next, Binary-Data will be described referring to FIG. 24.

To store binary-date, ACAML offers in the BinaryDataItemType two possibilities:
    BLOB: embedded as "xs:base64Binary"
    Reference to file.

The data-items (embedded or link) can be hold a flat list, or structured over various hierarchies like a file-directory.

Figure 25:
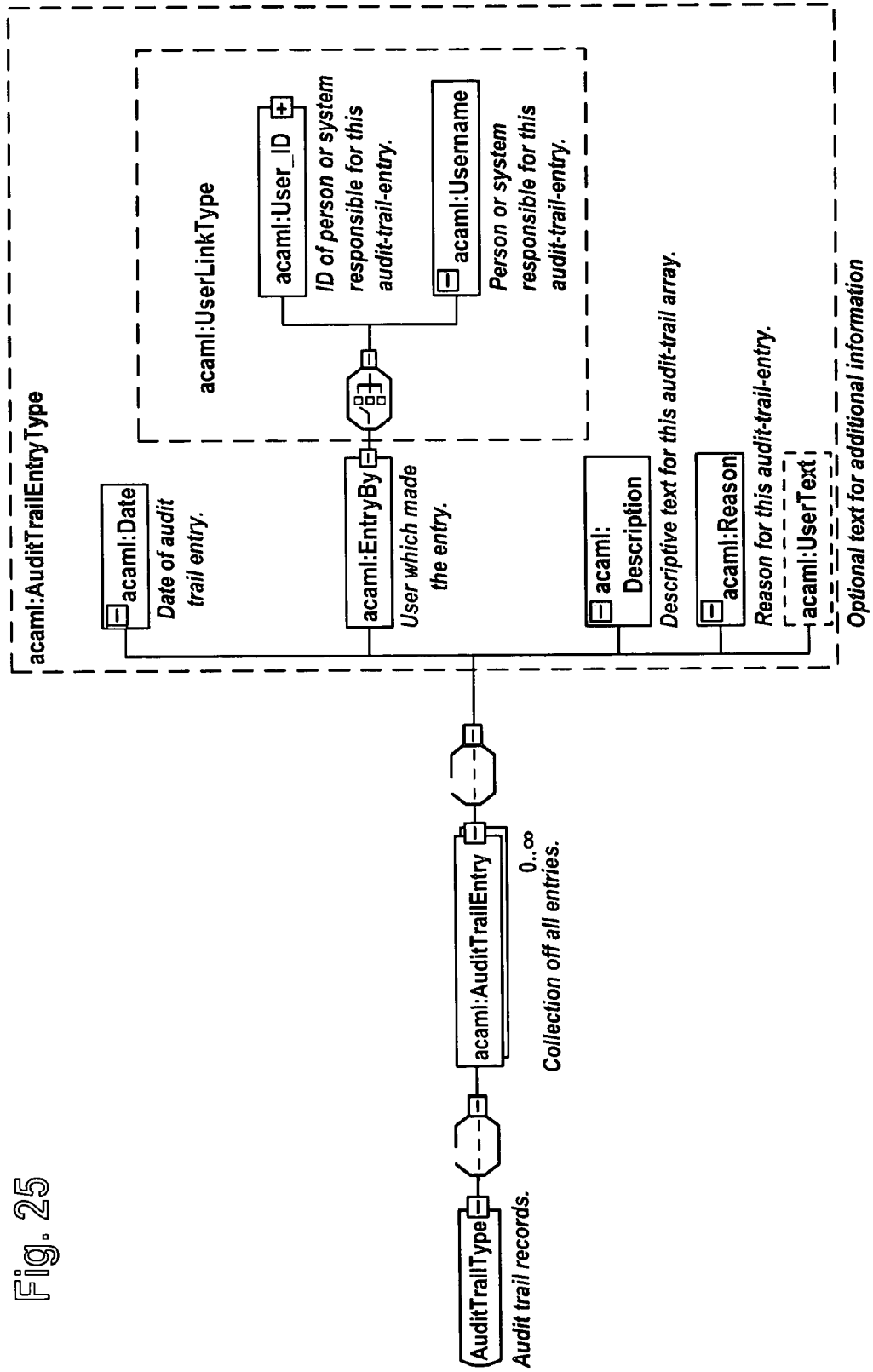
FIG. 25 illustrates an audit trail type.

Next, Audit-Trail will be described referring to FIG. 25.

The audit-trail in ACAML is defined by the AuditTrail-Type. The audit-trail data can be stored in ACAML in every type, which is derived from GenericObjectType.

Figure 26:
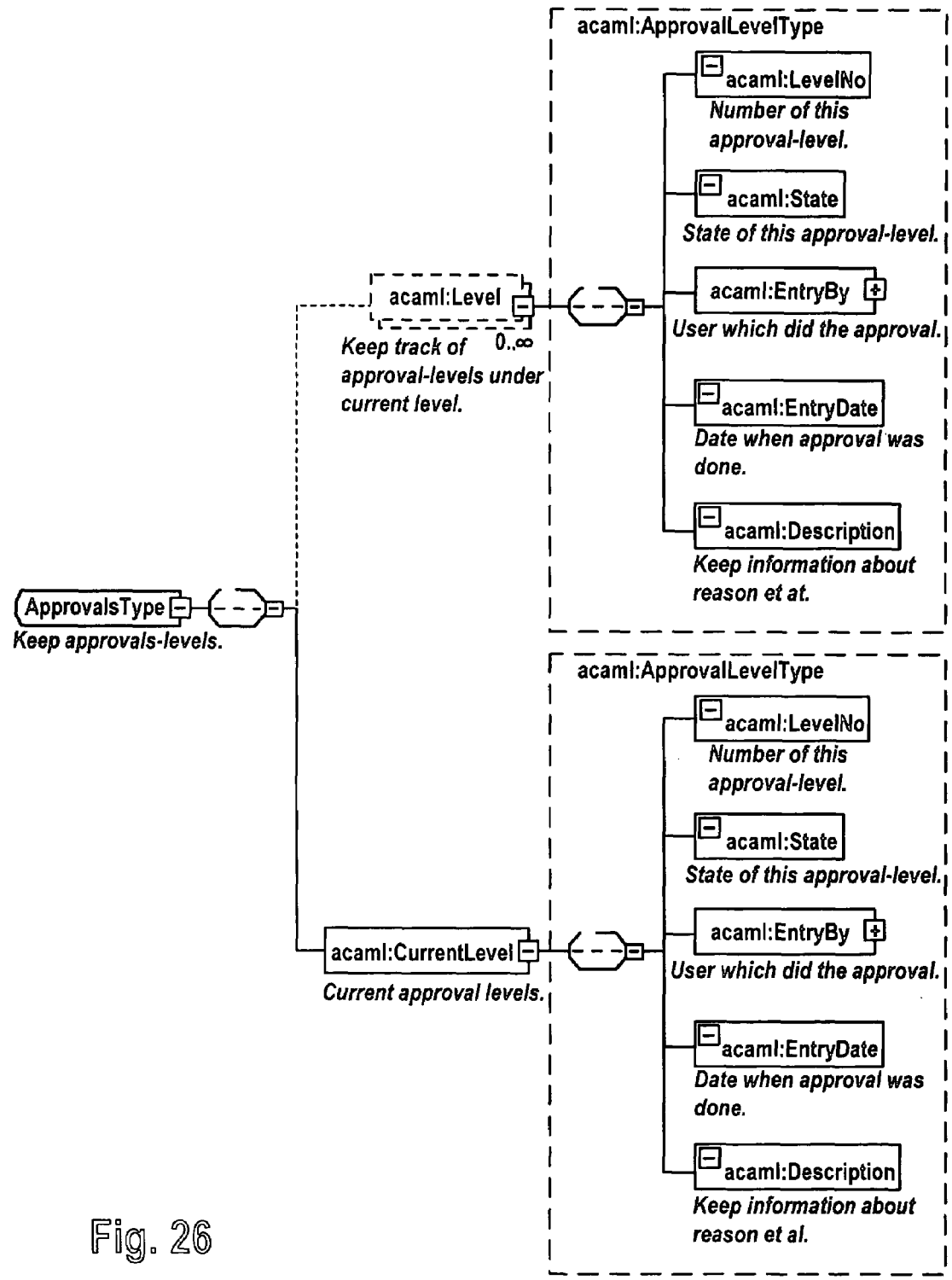
FIG. 26 illustrates an approvals type.

Next, Approval State will be described referring to FIG. 26.

This type keeps information about the state of 1 to n approval-levels.

The purpose of this type is not to log all changes in the approval-levels over time. It shall represent a vector of approval-levels, which represent the current approval scenario.

The "CurrentLevel"-element is introduced, to have a short-cut to the latest approval-level.

In the following "TechSpec Types"-building-block, the technique-specific type-definitions will be described.

In this context, technique-specific stuff in defined. Most of the ACAML-core-entities have a "TechSpec"-node, which as a specialized type like MethodTechSpecType.

Figure 27:
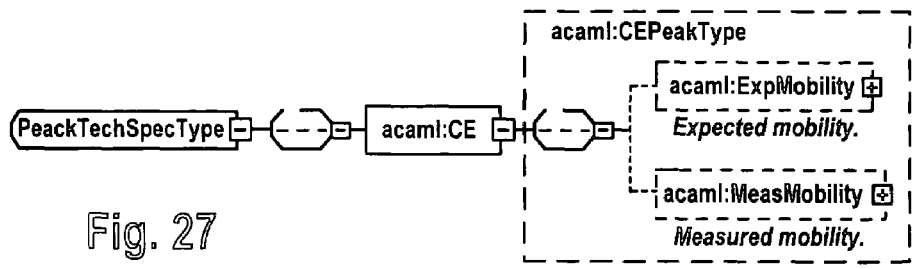
FIG. 27 illustrates an example for a tech-spec-type.

As an example for a tech-spec-type, FIG. 27 illustrates the PeakTechSpecType with one "CE" node.

In the following "AppSpec Types"-building-block, the application-specific type-definitions will be described.

In this context, application-specific stuff in defined. Most of the ACAML-core-entities have a "AppSpec"-node, which as a specialized type like MethodAppSpecType.

Figure 28:
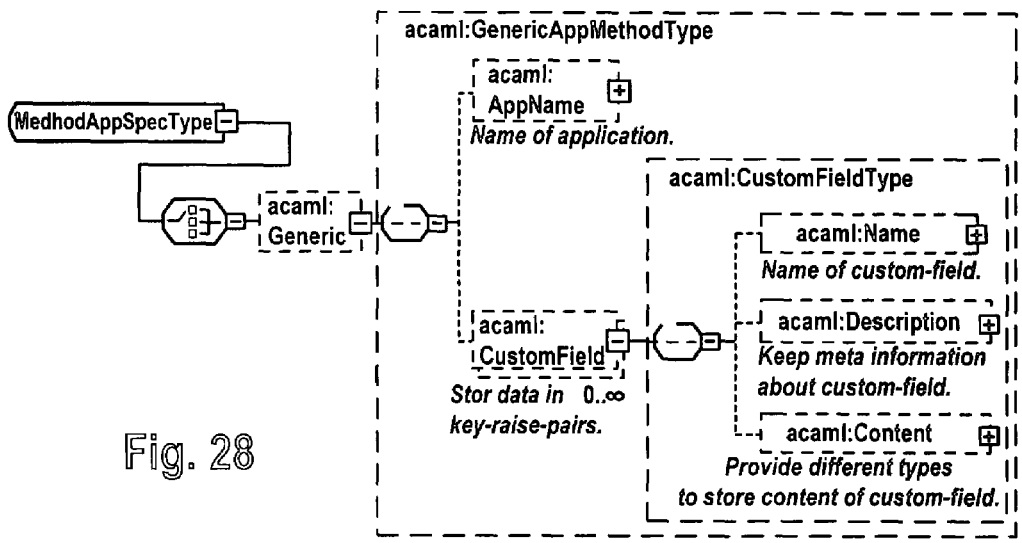
FIG. 28 illustrates an example for an application-spec-type.

As an example for an application-spec-type, FIG. 28 illustrates the MethodAppSpecType with one "Generic" node.

In the following "Core Types"-building-block, the core-type definitions will be described.

Figure 12:
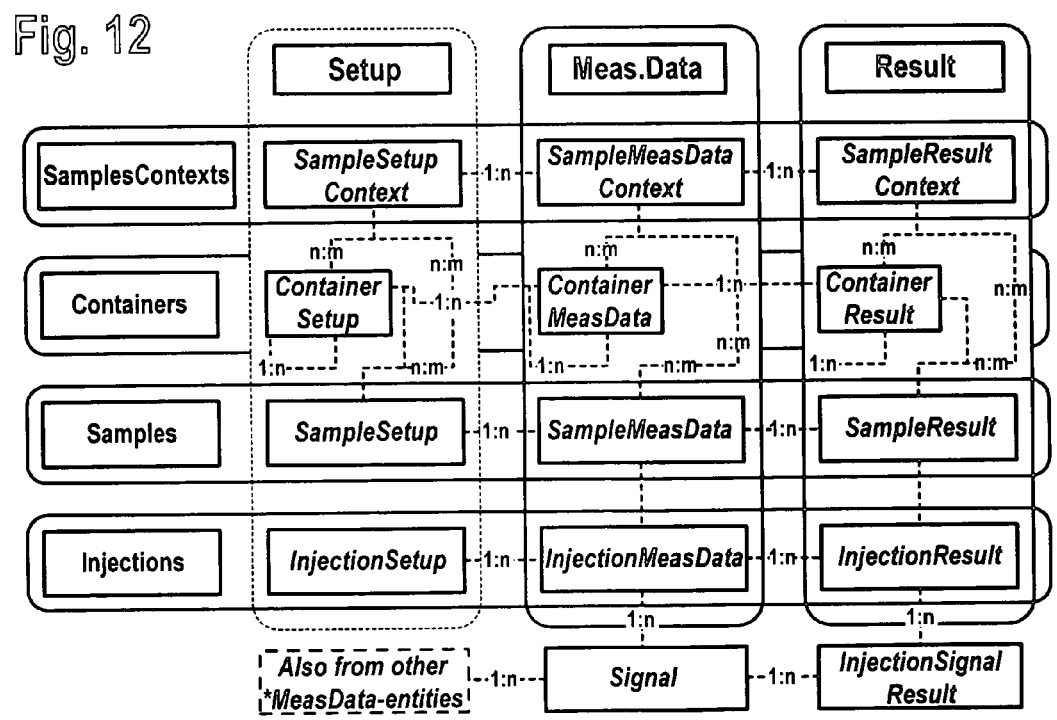
FIG. 12 illustrates a network of "Analysis-Core Objects".

This section uses definition for the ACAML-core-types, which are used in the "Network of Core-Objects" (see FIG. 12).

Also, other local types may be defined, for instance:

InstrumentType, MethodType, CompoundType, ProjectType, StudyType

There is also another representation of this ACAML-core in entity-relationship-diagram. This diagram shows not the complete aspects of the core-schema, but may help to understand the relationships between the entities (see FIG. 3).

In the following, the ACAML (Agilent Common Analytical Markup Language) will be described (building-block "ACAML").

This section combines a plurality of modules which will be explained in the following.

Also the only XML-element in ACAML, the root-element, is defined. This element is called "ACAML" and defines the top-document structure for each XML-instance-document. Here is the entry-point for every producer or consumer of the entire data in the documents.

Figure 29:
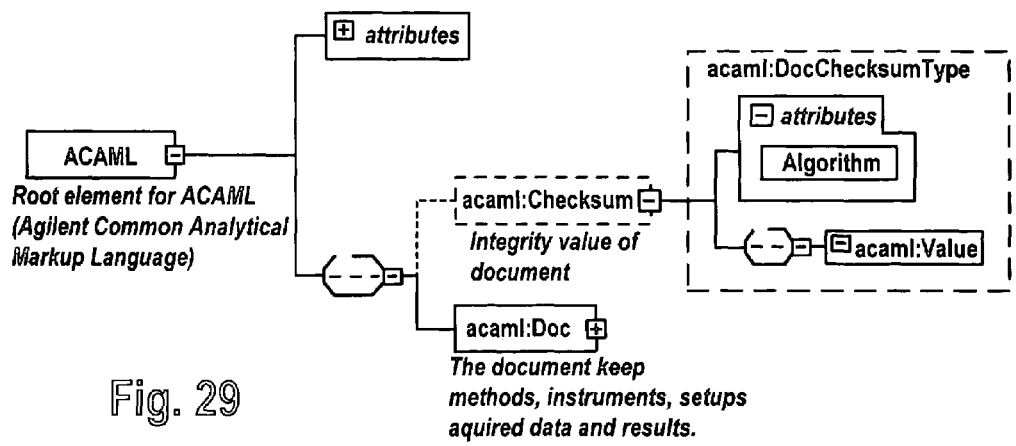
FIG. 29 illustrates root elements of the XML file.

In FIG. 29, the structure and the different parts of an ACAML-document are shown as the ACAML-Root-Element.

The root-element has two nodes:

"Doc": here is all information about the document and the analytical data stored.

"Checksum": integrity-value for the content of "Doc"-node.

The "Checksum"-node is placed on this top-level, to have a clear separation between included data and integrity-check of this data.

In the following, the ACAML-Document-Header will be described.

Under this node (type is DocType), information about the document itself and the analytical data is placed. This type can be seen as a document-header.

Figure 30:
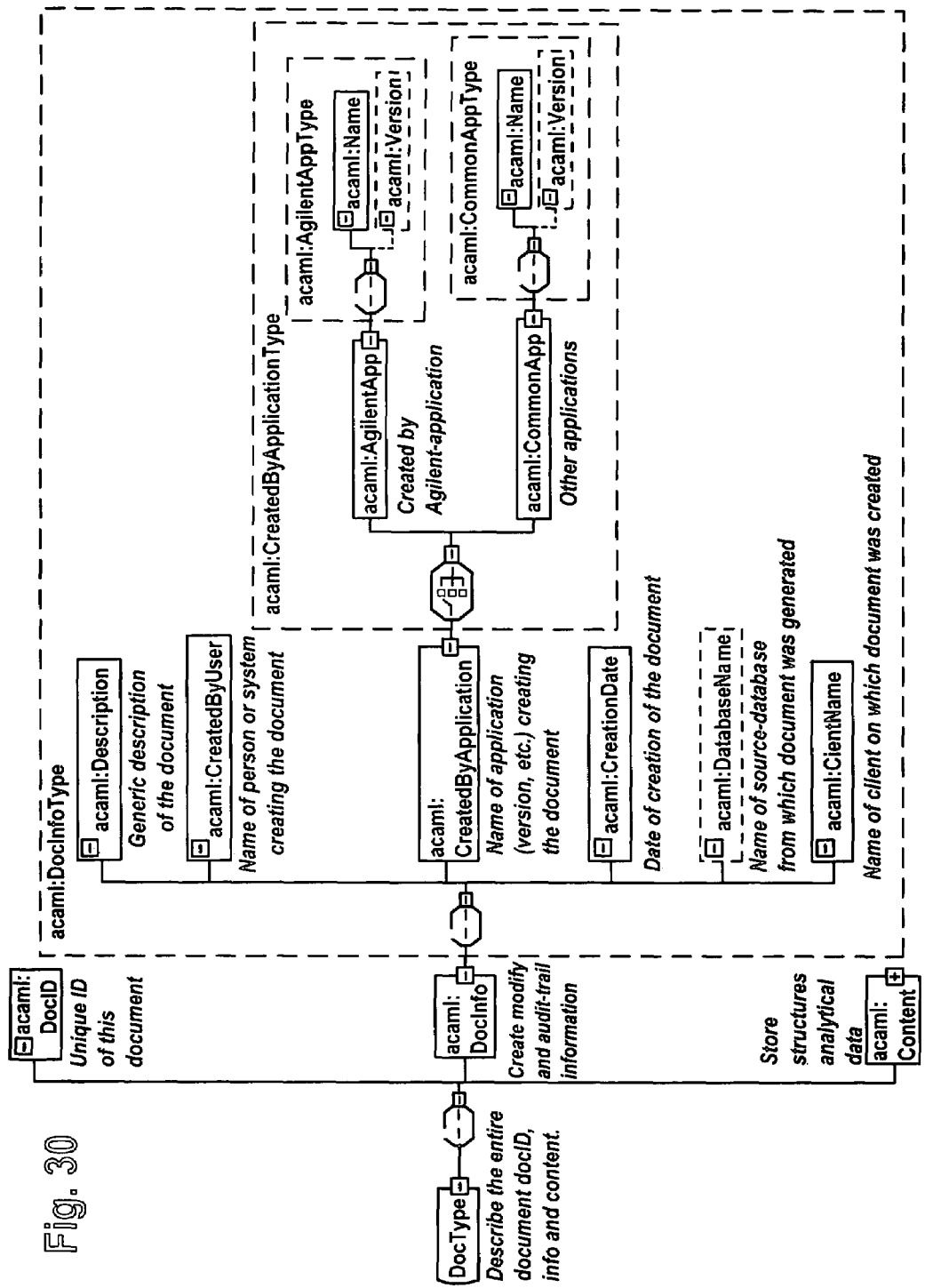
FIG. 30 illustrates a document structure of the XML file.

FIG. 30 illustrates the ACAML-Document-Structure.

In the following, the ACAML-Document-Content will be explained.

Under this element, all ACAML-elements like core-entities, other global entities and parameters are placed. The enrolment of the complete structure is extensive.

Figure 31:
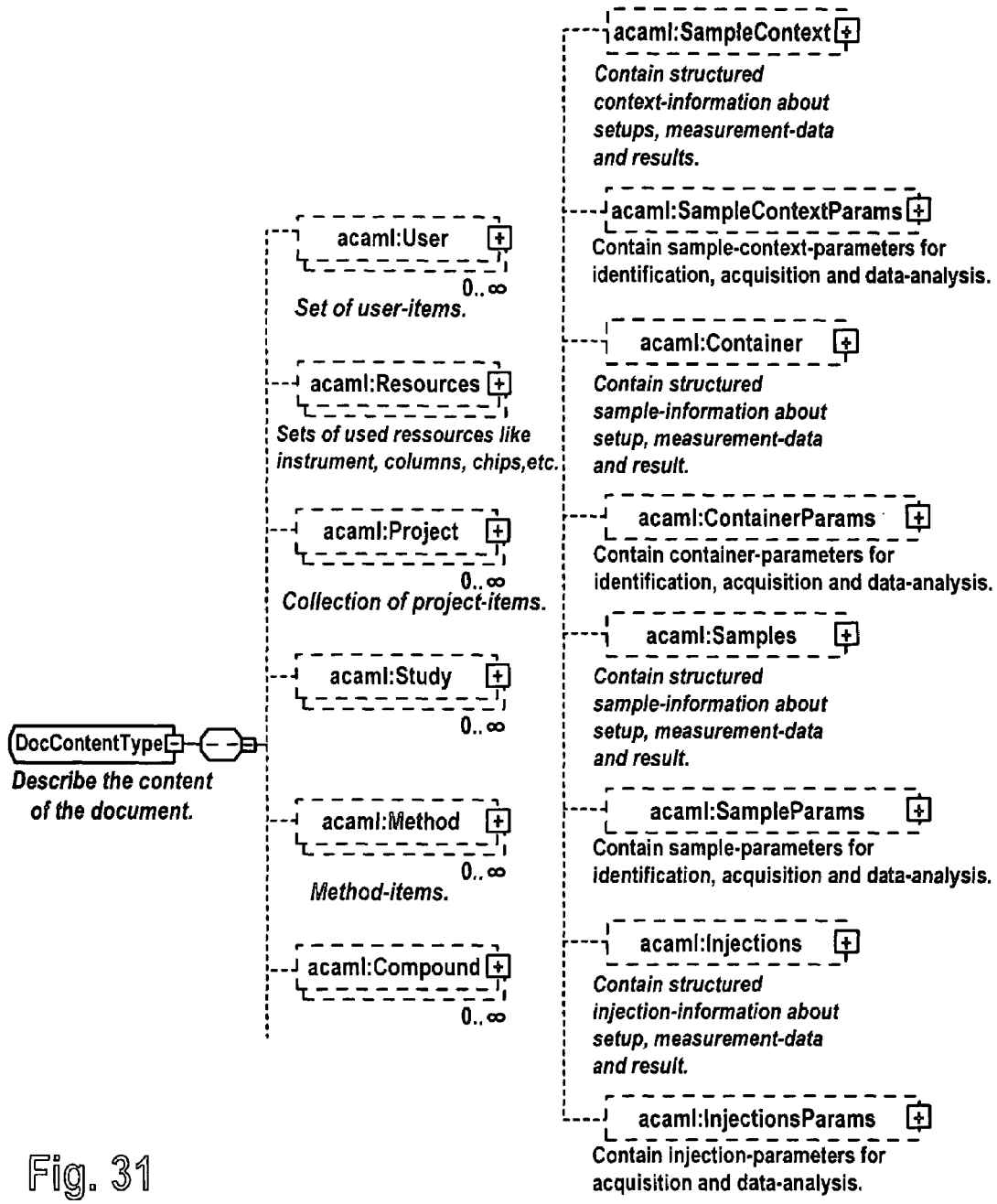
FIG. 31 illustrates documents content.

FIG. 31 illustrates the Documents-Content.

In the following, Referential-integrity Checks will be explained.

To ensure referential-integrity between all objects, two XML-standard-mechanisms are used in ACAML:

Hierarchical Composition: here the integrity is "build in"

Identity-Constraints: define key/foreign-keys, to define db-like relations.

All global "xs:key"- and "xs:keyref"-statements for above point 2 are placed in ACAML.xsd under the "Content"-node of the DocType.

Next, a common nomenclature for identity-constraint usage will be defined:

UK_*: Define a unique-key for entity *.
FK_*: Define a foreign-key to entity *
id: Key-attribute for a non-versioned type.
id, ver: Key-attributes for a versioned type.
*_ID: Reference-element to a versioned/non-versioned object.

In the following, a relation between NonVersionedObject-Base-Types will be explained.

Next, a naming-convention will be defined:
Element: *Type with attribute "id" as unique key.
Base: NonVersionedObjectBaseType.
Reference: *RefType with attribute "id" as foreign-key to *Type/@id.
Base: NonVersionedObjectBaseType.
Identity-Constraints (*=entity-name)

```
<xs:key name="UK_*s">
    <xs:selector xpath=".//acaml:*"/>
    <xs:field xpath="@id"/>
</xs:key>

<xs:keyref name="FK_*" refer="acaml:UK_*s">
    <xs:selector xpath=".//acaml:*_ID"/>
    <xs:field xpath="@id"/>
</xs:keyref>
```

Next, an example for InjectionCompoundType will be given:

Element-type InjectionCompoundType.
Element:<InjectionCompound id="14"> . . . </InjectionCompound>.
Reference-type: InjectionCompoundRefType.
Reference-element: <InjectionCompound_ID id="14"/>.
Identity-Constraints (for unique injection-compound-id's in scope of injection-result):

```
<xs:key name="UK_InjectionResultInjectionCompounds">
    <xs:selector xpath=".//acaml:Result/acaml:Compound"/>
    <xs:field xpath="@id"/>
</xs:key>

<xs:keyref name="FK_InjectionResultInjectionCompound"
    refer="acaml:UK_InjectionResultInjectionCompounds">
    <xs:selector xpath=".//acaml:InjectionCompound_ID"/>
    <xs:field xpath="@id"/>
</xs:keyref>
```

Figure 32:
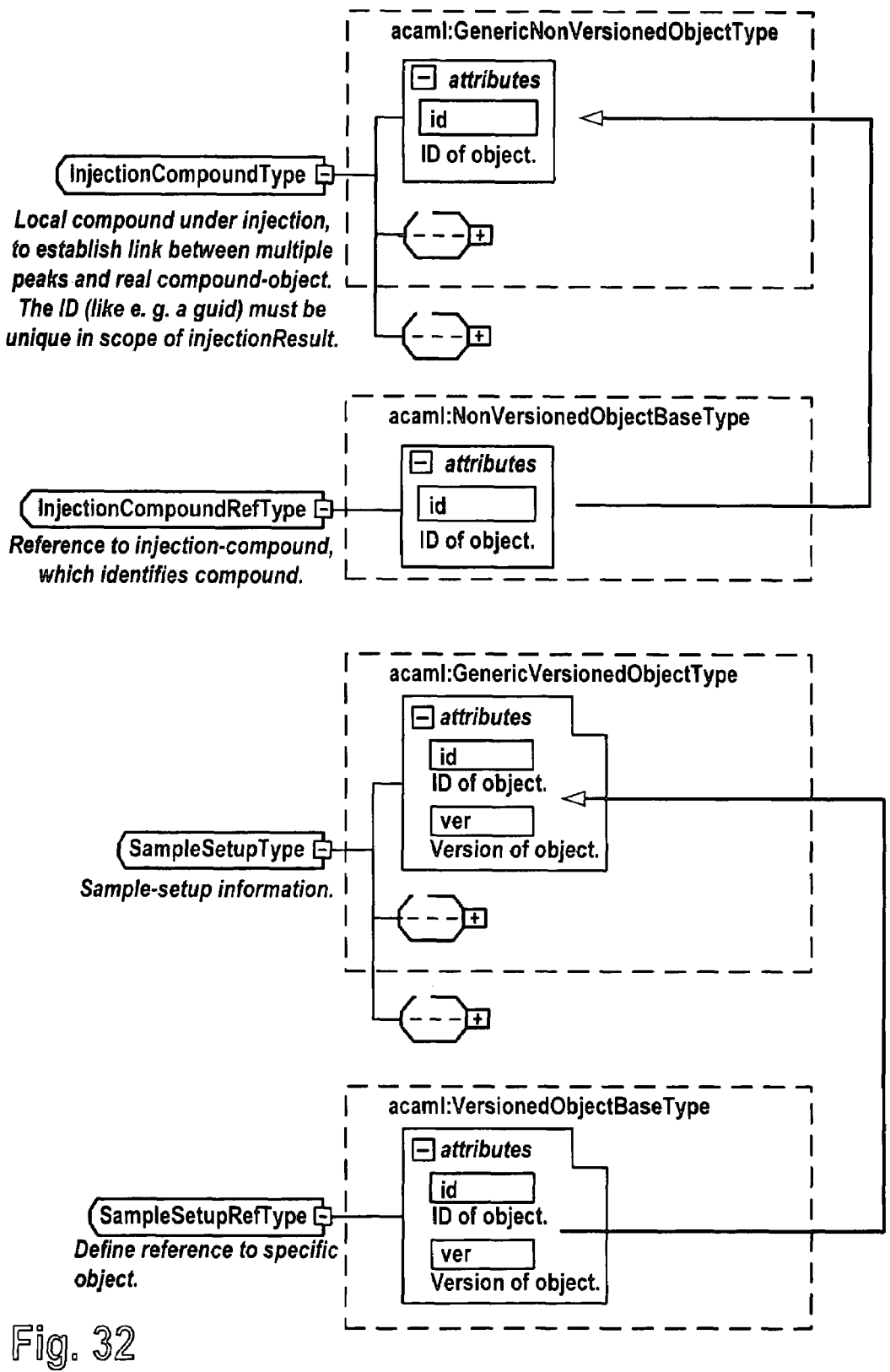
FIG. 32 illustrates an example for a relation to injection compound type.

FIG. 32 shows, as an example, the relation to InjectionCompoundType.

In the following, the relation between VersionedObject-Base-Types will be explained.

Next, a naming-convention will be defined:
Element: *Type with attributes "id, "ver"" as unique key-tuple.
Base: VersionedObjectBaseType.
Reference: *RefType with attributes "id, "ver"" as foreign-key-tuple to *Type/(@id, @ver).
Base: VersionedObjectBaseType.
Identity-Constraints (*=entity-name)<

```
xs:key name="UK_*s">
    <xs:selector xpath=".//acaml:*"/>
    <xs:field xpath="@id"/>
    <xs:field xpath="@ver"/>
</xs:key>

<xs:keyref name="FK_*" refer="acaml:UK_*s">
    <xs:selector xpath=".//acaml:*_ID"/>
    <xs:field xpath="@id"/>
    <xs:field xpath="@ver"/>
</xs:keyref>
```

Next, an example for SampleSetupType will be given:
Element-type: SampleSetupType.
Element: <SampleSetup id="7222" ver="1"> . . . </SampleSetup>.
Reference-type: SampleSetupRefType.
Reference-element: <SampleSetup_ID id="7222" ver"1"/>.
Identity-Constraints (for unique sample-setup-key in scope of whole document):

```
<xs:key name="UK_SampleSetups">
    <xs:selector xpath=".//acaml:Samples/acaml:Setup"/>
    <xs:field xpath="@id"/>
```

```
<xs:field xpath="@ver"/>
    </xs:key>
<xs:keyref name="FK_SampleSetup" refer="acaml:UK_SampleSetups">
    <xs:selector xpath=".//acaml:SampleSetup_ID"/>
    <xs:field xpath="@id"/>
    <xs:field xpath="@ver"/>
</xs:keyref>
```

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed is:

1. A method of processing data, the method comprising providing input data by a measurement device;
using a processor unit for converting the input data into output data provided in a unified data format, wherein the unified data format is a unique data format which is independent of individual formats of various measurement devices, wherein the unique data format is a combination of a hierarchical and a relational data format, and the relational data format is a format in which data items are grouped to data item groups being logically linked to one another; and
providing the output data to a connected device for further processing.

2. The method of claim 1, wherein the measurement device includes a plurality of measurement devices or a plurality of types of measurement devices and the input data is provided in a proprietary data format which relates to a privately developed and/or privately owned technology.

3. The method of claim 1, wherein the unified data format is based on a normalized, standardized, data schema.

4. The method of claim 1, further comprising filtering at least a part of the input data and providing the filtered input data as the output data; wherein
a non-filtered part of the input data includes pre-processed measurement data, wherein filtering at least a part of the input data includes selecting one or more items of the input data according to one or more predetermined selection criteria.

5. The method of claim 1, further comprising coupling output data items by means of pointers pointing from one of the output data items to another one of the output data items, wherein
the output data items comprise at least one of the group consisting of measurement user data items, measurement resource data items, measurement setup data items, measurement content data items, and measurement result data items.

6. The method of claim 1, wherein the input data includes at least one parameter of an analyte under examination, the parameter selected from the group consisting of physical, chemical, and/or biological.

7. The method of claim 1, wherein the unified data format is a human readable format, wherein the human readable format is a format which is understandable for a human being.

8. The method of claim 1, wherein the unified data format is a machine readable format, wherein the machine readable format is a format which is processable by means of computational resources.

9. The method of claim 1, wherein the unified data format is a plaintext format, wherein the plaintext format is a format which comprises a sequence of letters and numbers.

10. The method of claim 1, wherein the unified data format is a format in which content data of the input data is separated from structural data of the input data, wherein the structural data is data related to data management and/or to linkage of the content data.

11. The method of claim 1, wherein the unified data format is a unique data format independent of the individual format of each measuring device.

12. The method of claim 1, further comprising filtering at least a part of the input data and providing the filtered input data as the output data; wherein the filtered part of the input data includes or consists of raw measurement data, wherein the raw measurement data is data directly received from a measurement free from any pre-processing.

13. The method of claim 1, further comprising filtering at least a part of the input data and providing the filtered input data as the output data; wherein a non-filtered part of the input data includes pre-processed measurement data, wherein the pre-processed measurement data is raw measurement data which have been modified or analyzed according to a predetermined processing schema.

14. The method of claim 1, further comprising coupling output data items by means of pointers pointing from one of the output data items to another one of the output data items, wherein each of the output data items comprises an assigned unique two dimensional identifier.

15. A computer-readable medium, on which a computer program of processing data is stored, or a program element of processing data, which computer program or program element, when being executed by a processor, is adapted to carry out the method of claim 1.

* * * * *